United States Patent [19]

Yagi et al.

[11] Patent Number: 4,745,902
[45] Date of Patent: May 24, 1988

[54] IGNITION TIMING CONTROL METHOD FOR INTERNAL COMBUSTION ENGINE

[75] Inventors: Shizuo Yagi, Asaka; Yoshiaki Hirosawa, Shiki; Makoto Kawai, Tokorozawa; Yorihisa Yamamoto, Shiki; Haruhiko Yoshikawa, Niiza; Kenichi Nakamuna, Fujimi, all of Japan

[73] Assignee: Honda Giken Kogyo Kabushiki Kaisha, Tokyo, Japan

[21] Appl. No.: 868,588

[22] Filed: May 30, 1986

[30] Foreign Application Priority Data

May 30, 1985 [JP] Japan ............................ 60-117231
Aug. 9, 1985 [JP] Japan ............................ 60-175176
Aug. 9, 1985 [JP] Japan ............................ 60-175177

[51] Int. Cl.⁴ .............................................. F02P 5/10
[52] U.S. Cl. ...................................... 123/425; 123/435
[58] Field of Search ................................ 123/425, 435

[56] References Cited

U.S. PATENT DOCUMENTS

| | | | |
|---|---|---|---|
| 3,957,023 | 5/1976 | Peterson | 123/425 |
| 4,190,027 | 2/1980 | Inui et al. | 123/425 X |
| 4,211,194 | 7/1980 | Hattori et al. | |
| 4,328,779 | 5/1982 | Hattori et al. | |
| 4,397,285 | 8/1983 | O'Neill | 123/425 X |
| 4,406,265 | 9/1983 | Brandt et al. | |
| 4,417,556 | 11/1983 | Latsch | 123/425 |
| 4,466,408 | 8/1984 | Cheklich | 123/425 |
| 4,481,925 | 11/1984 | Karau et al. | |
| 4,660,535 | 4/1987 | Asano | 123/425 |

*Primary Examiner*—Tony M. Argenbright
*Attorney, Agent, or Firm*—Birch, Stewart, Kolasch & Birch

[57] ABSTRACT

An ignition timing control method for an internal combustion engine which controls the ignition timing of the engine in response to the indicative pressure signal representing the inner pressure of the combustion chamber while keeping the maximum peak position of the indicative pressure signal around a target position or zone. The target position or zone is regulated in accordance with one or more engine parameters.

21 Claims, 25 Drawing Sheets

IGNITION TIMING CONTROL METHOD FOR INTERNAL COMBUSTION ENGINE

FIELD OF THE INVENTION

The present invention relates to an ignition timing control method for an internal combustion engine and, in particular, to an ignition timing control method for controlling ignition timing of an internal combustion engine so as to cause the maximum pressure within the combustion chamber due to combustion to occur during an optimum crank angle region.

BACKGROUND OF THE INVENTION

It is possible to obtain the so-called indicative pressure signal representative of the inner pressure of the combustion chamber of an internal combustion engine by providing a pressure sensor such as a piezo-electric element in a bore extending into combustion chamber of the engine through a member such as a cylinder head. A pressure gauge may be otherwise interposed between the cylinder head and the cylinder block of the engine, which functions as the pressure sensor for producing the indicative pressure signal.

It will be seen that the internal pressure in the combustion chamber under operation of the engine changes as indicated by a curve A in FIG. 1. When the ignition system of the engine is triggered at an ignition angle $\theta IG$, the air-fuel mixture supplied thereto starts firing with a time delay of $\theta d$ and, subsequently, the internal pressure rapidly increases up to a maximum pressure peak (referred to as an indicative pressure peak hereinafter) and then decreases.

It is known that a crank angle position of the indicative pressure peak has a certain relationship with the state of the engine at which the maximum output is produced, and the indicative pressure peak giving the maximum engine output has been found, by experiment, to be located between 12 to 13 degrees after the top dead center (referred to as ATDC hereinafter) as shown in the drawings. Therefore, ATDC 12 to 13 degrees may be considered as an ideal crank angle region. It is therefore desirable to determine the ignition timing $\theta IG$ so that the indicative pressure peak occurs within the ideal crank angle region which is ATDC 12 to 13 degrees.

Even if, however, the ignition timing $\theta IG$ is determined, the indicative pressure peak varies from time to time depending on the operating conditions of the engine and, therefore, an ignition timing control device is desired which can constantly maintain the indicative pressure peak within the optimum region under various engine operational conditions.

A feed-back ignition timing control system was disclosed in U.S. Pat. No. 4,481,925 issued Nov. 13, 1984. The feed-back ignition timing control system controls the ignition timing of an internal combustion engine in response to the indicative pressure signal to keep the indicative pressure peak position within an optimum region.

This prior art ignition timing control system is advantageous in avoiding adverse influence by high frequency noises contaminating the indicative pressure signal.

It is however still required to regulate the ignition timing of the interval combustion engine in a more improved manner so as to comply with various engine operational conditions.

SUMMARY OF THE INVENTION

Thus, a primary object of this invention is to provide an improved ignition timing control method for an internal combustion engine which can optimally control the ignition angle in accordance with an indicative pressure peak position signal and one or more engine parameters representing engine operational conditions.

In the ignition timing control method according to the present invention, the internal pressure of a cylinder is directly detected as an indicative pressure peak signal giving the indicative pressure peak datum for every engine cycle. The indicative pressure peak datum is compared with a crank angle reference position datum while changing the manner of discrimination in dependence on one or more of the engine parameters so that the actual ignition timing is advanced or retarded for every engine cycle thereby to comply with changes of the engine operational conditions.

DETAILED DESCRIPTION OF EMBODIMENTS

Figure 2:
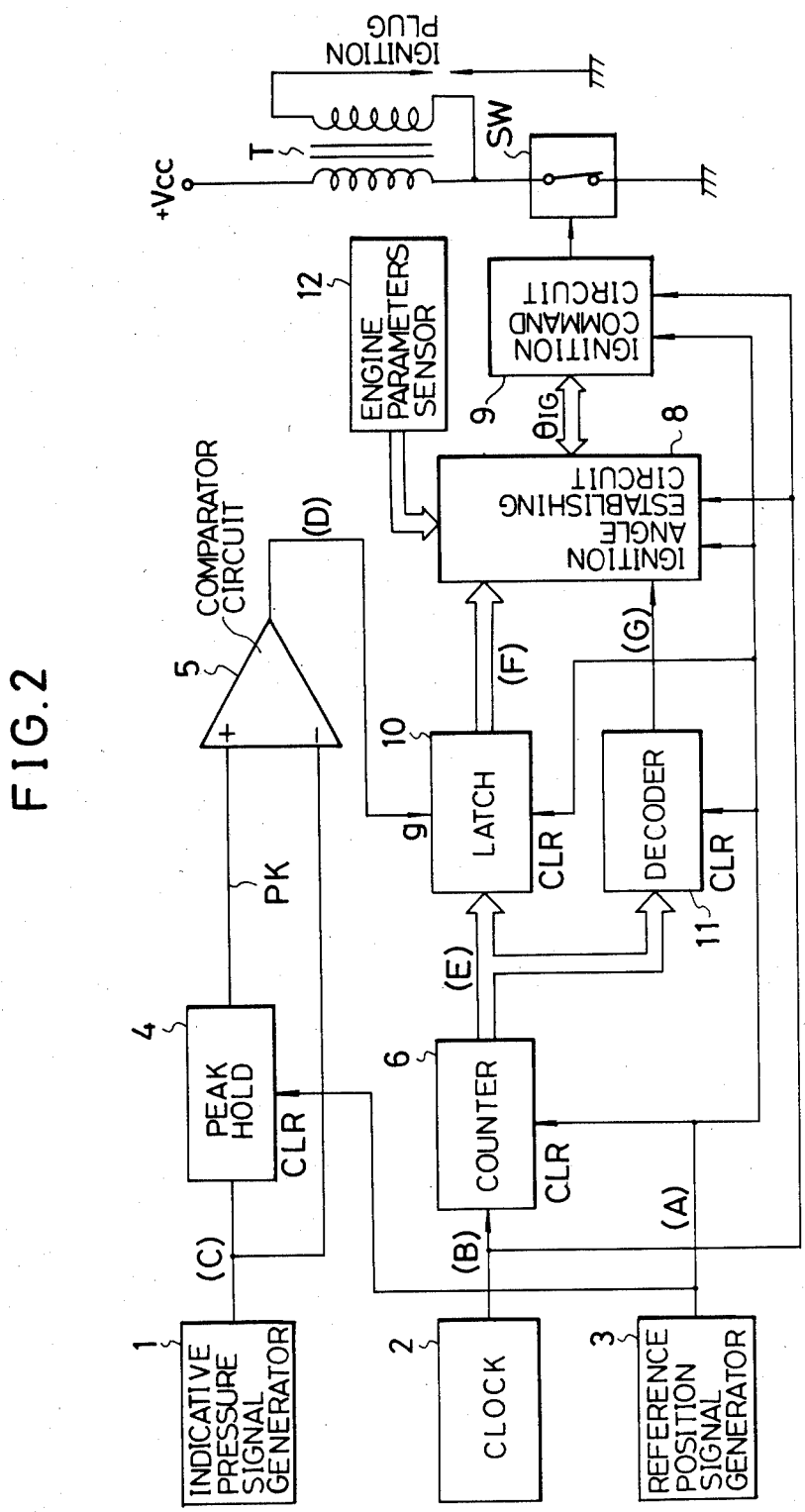
FIG. 2 is a circuit diagram showing an embodiment of the present invention.

FIG. 2 shows an ignition timing control system according to the present invention, and this system comprises an indicative pressure signal generating circuit 1 which generates an indicative pressure signal by using a pressure sensor which may include a piezo-electric element and is inserted into a bore provided through a member such as a cylinder head which defines a combustion chamber of an internal combustion engine in such a manner that the detection head of the pressure sensor is exposed to the interior of the combustion chamber. A clock generating circuit 2 produces clock pulses appearing in synchronism with the rotation of the engine. Means for obtaining clock pulses which are in synchronism with the rotation of the engine may consist of a disc which rotates in synchronism with the engine and has a plurality of slits in combination with a photo-coupler in such a manner that the clock pulses may be obtained from the output signal of the photo-coupler. A reference position generating circuit 3 produces a reference position signal, for example a TDC (Top Dead Center) pulse, which indicates that the crank angle position or the engine rotational angle position has reached a reference position. The TDC pulse may be obtained by providing a separate slit for TDC pulses in the disc which is already provided with the slits used for the clock generating circuit 2, in combination with a photocoupler for generating TDC pulses. A peak hold circuit 4 holds the maximum value of the indicative pressure signal after it is cleared by the reference position signal. A comparator circuit 5 produces a peak detection signal when the indicative pressure signal has fallen below its maximum value kept by the peak hold circuit 4. A counter 6 for measuring the crank angle position counts the number of the clock pulses and is reset by the reference position signal. The count value of the counter 6 which may be 8-bit data indicates the current value of the crank angle. A latch circuit 10 latches the count value of the counter 6 every time the peak detection signal from the comparison circuit 5 is supplied to the gate terminal g of the latch circuit 10, while a decoder 11 supplies a read-in command signal to an ignition angle establishing circuit 8 when the count value of the counter 6 reaches a predetermined value, for instance "63". The count value of "63" corresponds to a crank angle which is greater than any crank angle at which the indicative pressure peak is expected to occur, and the read-in timing is so selected that it will not be interfered by noises such as the combustion noises and the valve seating noises caused by the operation of the inlet and/or exhaust valves. The ignition angle establishing circuit 8 accordingly reads out or takes the contents of the latch circuit 10 and determines the indicative pressure peak position datum $\theta_{px}$ from the contents of the latch circuit 10. It is also possible to use a structure according to which the contents of the latch circuit 10 are supplied to the ignition timing establishing circuit 8 by way of a gate circuit which opens its gate by a read-in command signal from the decoder 11. The ignition angle establishing circuit 8 may consist of a microprocessor and supplies a desired ignition angle $\theta_{IG}$ datum to an ignition command circuit 9 according to a program, which is described hereinafter, and the peak position information (data) supplied thereto. The ignition command circuit 9 detects the current value of the crank angle $\theta_{ig}$ by counting the clock pulses while using the reference position signal as a reference. The ignition command circuit 9 closes an ignition switch SW when the current crank $\theta_{ig}$ and the input $\theta_{IG}$ coincide with each other, whereby ignition current is passed through the primary winding of an ignition transformer T and a spark ignition takes place at an ignition plug. Accordingly, the desired ignition angle $\theta_{IG}$ is a next-cycle ignition angle datum for governing the ignition during the next engine cycle succeeding to the present engine cycle causing the appearance of the indicative pressure peak $\theta_{px}$. The ignition angle establishing circuit 8 and the ignition command circuit 9 form the ignition command means. The ignition angle establishing circuit 8 may be equipped with a mode in which the ignition angle establishing circuit 8 operates according to various parameters, such as rotational speed of the engine Ne, intake negative pressure $P_B$, throttle opening $\theta_{th}$ and so on, obtained from engine parameter sensors 12.

Figure 3:
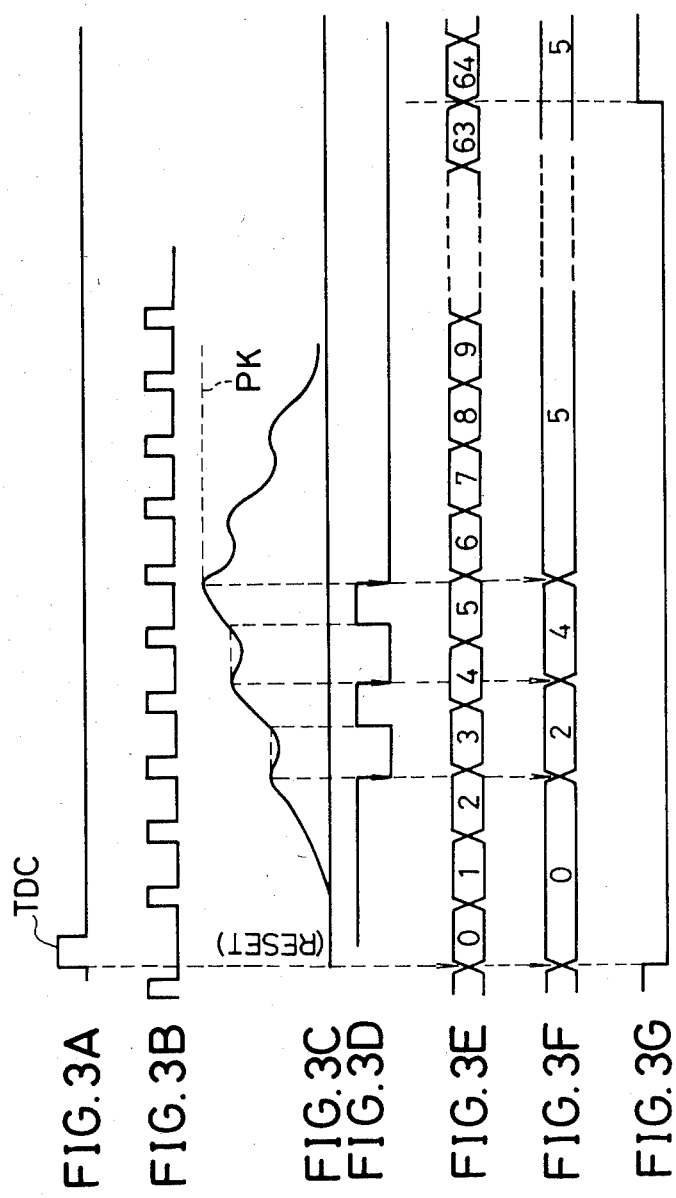
FIGS. 3A through 3G are diagrams illustrating waveforms of signals appearing in the circuit of FIG. 2.

FIGS. 3A to 3F show signal waveforms for illustrating the actions of the above-described circuits. Specifically, the reference position signal and the clock pulses appear as shown in FIGS. 3A and 3B, respectively. The indicative pressure signal changes in such a manner as shown by a solid line in FIG. 3C and the output of the peak hold circuit 4 therefore changes in such a manner as shown by the dotted line in FIG. 3C. The comparator circuit 5 produces a peak detection pulse signal upon detection of every local maximum of the indicative pressure signal as shown in FIG. 3D. FIG. 3E shows the changes of the count values of the counter 6 in decimals.

FIG. 3F shows the contents of the latch circuit 10 in decimals. FIG. 3G shows the changes in the output of the decoder 11 and, in this case, a higher level corresponds to the read-in command signal.

Figure 4:
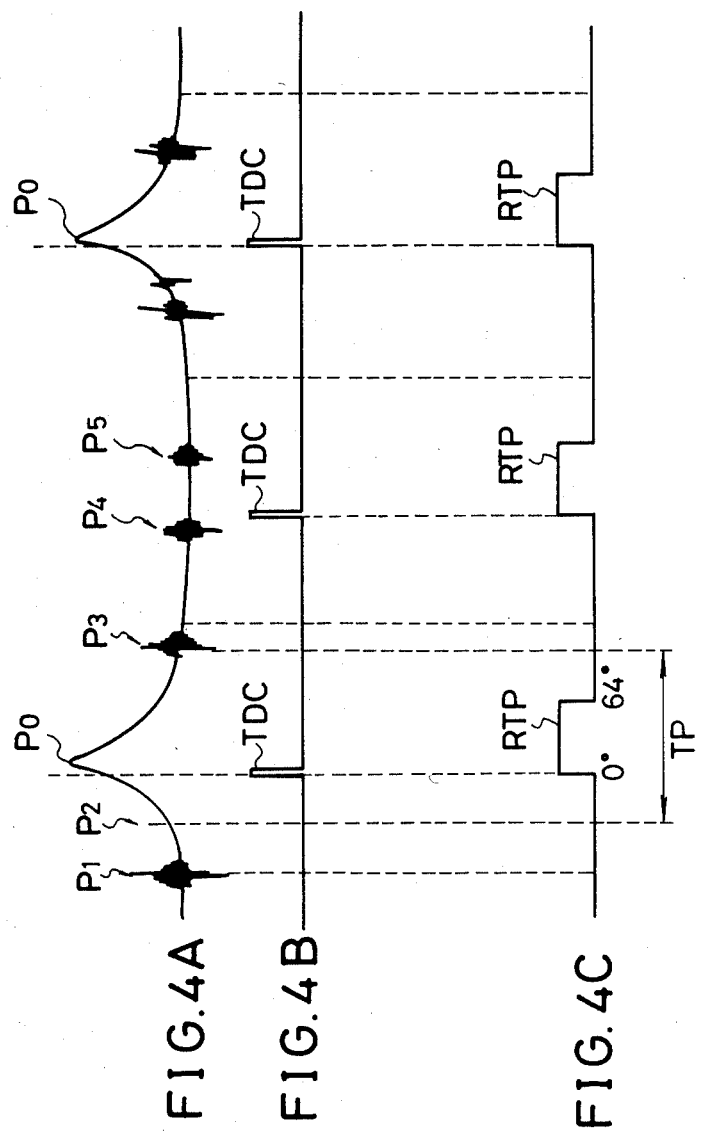
FIG. 4A is a diagram showing a waveform of the indicative pressure signal.
FIG. 4B is a diagram showing a waveform of TDC pulses.
FIG. 4C is a diagram showing gate timings for receiving the indicative pressure peak data.

FIG. 4A shows an example of waveform of the indicative pressure signal which contains maximum peak values $P_O$, valve seating noises P1, P3, P4 and P5, and an ignition noise $P_a$. FIG. 4B shows waveforms of the reference position pulses each appearing at the TDC. FIG. 4C shows that the ignition timing control system restricts the time period for picking up the maximum peak position information to a short time period RTP (0 degree to 64 degree), that is, from the TDC to the predetermined crank angle corresponding the decoding number of, in this embodiment, 63. The short time period RTP is contained within the time period from the ignition timing to the valve seating timing, so that the operation for picking up the maximum peak position information is not adversely affected by the ignition noises and valve seating noises etc.

Figure 1:
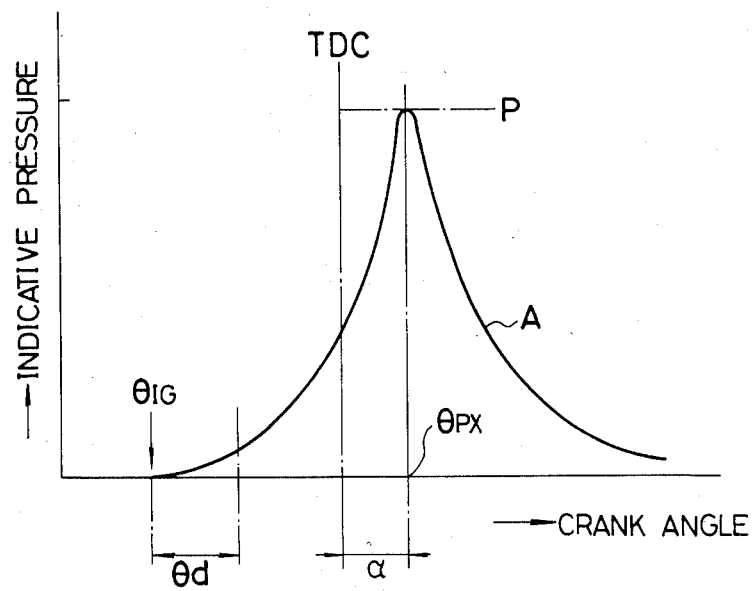
FIG. 1 is a graph showing the changes in the internal pressure of an engine cylinder.
Figure 5:
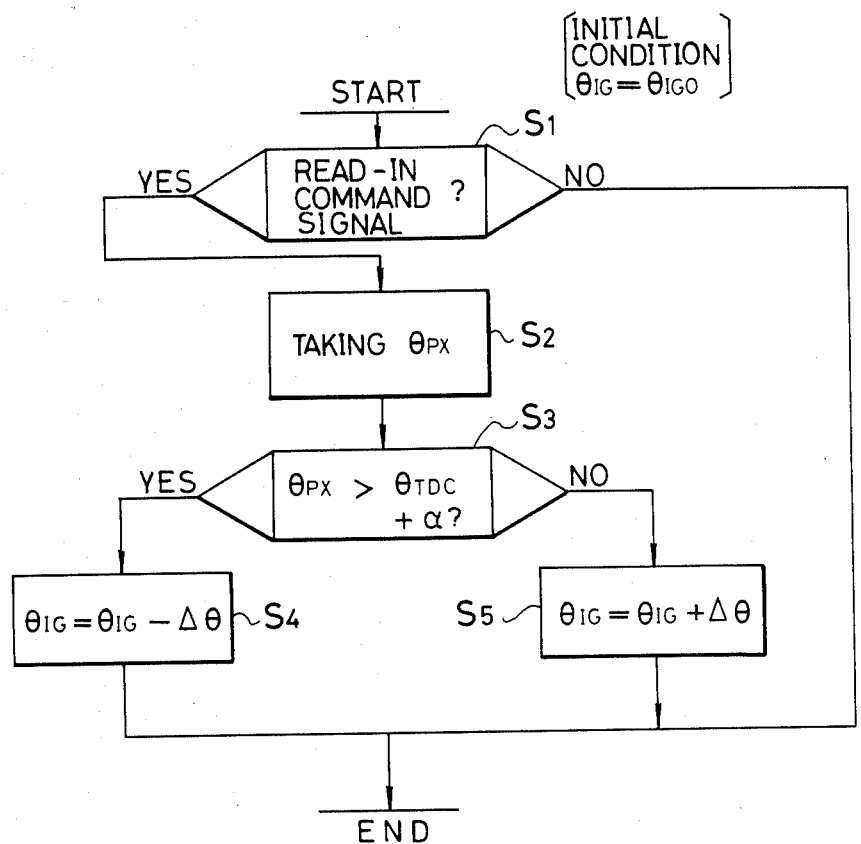
FIGS. 5 and 6 are flow charts describing basic action programs of the micro-computer portions of the device of FIG. 2.

FIG. 5 shows an example of the program governing the ignition control operation of the ignition angle establishing circuit 8 of the system shown in FIG. 1 when the circuit 8 is constructed using a microprocessor. In performing the ignition control action, the ignition angle establishing circuit 8 initially establishes or determines the ignition angle $\theta_{IG}$ at an initial value $\theta_{IGO}$ and waits for the read-in command signal from the decoder 11, and, upon receipt of the read-in command signal, takes therein the latch contents of the latch circuit 10 as the peak position information $\theta_{px}$ (steps S1 and S2). Then, it is distinguished if the peak position information $\theta_{px}$ is greater than the sum of the top dead center angle $\theta_{TDC}$ and a certain angle $\alpha$, for instance 12 degrees, or not (step S3). If $\theta_{px} > \theta_{TDC} \times \alpha$, then the ignition angle $\theta_{IG}$ is advanced by $\Delta\theta$ (step S4) and, if not, the ignition angle $\theta_{IG}$ is delayed by $\Delta\theta$ (step S5). These actions from start to end, steps S1 to S5, are sequentially executed and cyclically repeated. This is the case with other programs which are referred to hereinafter.

Figure 6:
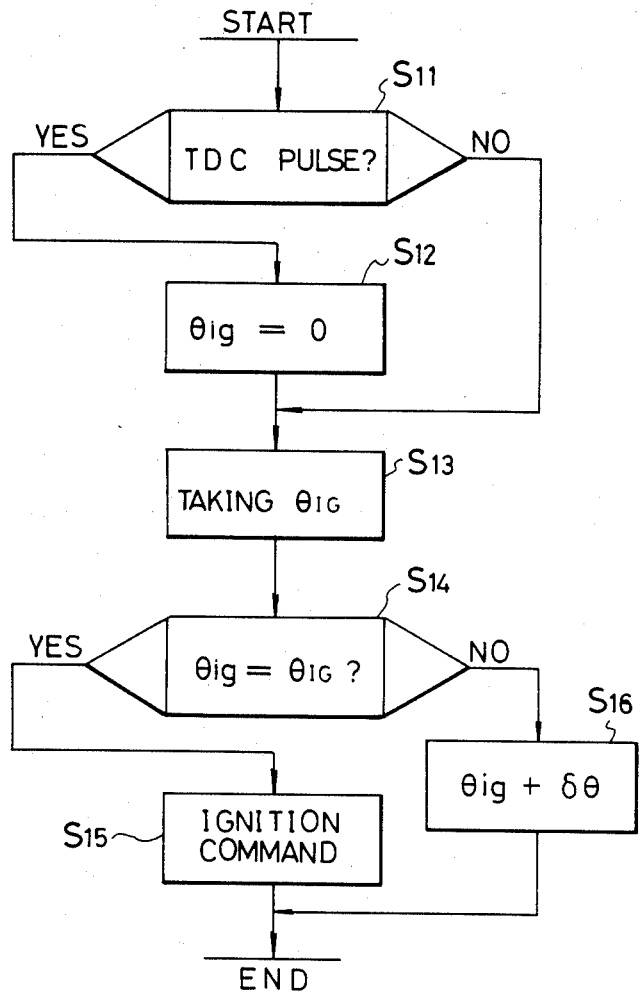

FIG. 6 shows an example of the action program of the ignition command circuit 9 when it is made of a micro- -processor, When the ignition command circuit 9 detects the reference position signal (step S11), the present value of the crank angle $\theta_{ig}$ is set to $\theta_{TDC}$ (or a predetermined value) (step S12). Then, the ignition angle data $\theta_{IG}$ from the ignition angle establishing circuit 8 is taken in (in step S12) and this data is compared with the present value of the crank angle $\theta_{ig}$. If the relationship $\theta_{ig} = \theta_{IG}$ holds, the ignition command is issued (steps S14 and S15) and the ignition switch SW is closed. On the other hand, if $\theta_{ig} \neq \theta_{IG}$ holds, a unit angle $\delta\theta$ is added to the $\theta_{ig}$ (step S16) and the program flow stands by for the next program cycle. It is also possible to determine whether the difference between the $\theta_{ig}$ and $\theta_{IG}$ is greater or smaller $\delta\theta$, in step S14, instead of determining whether $\theta_{ig} = \theta_{IG}$ holds or not.

In the above-described embodiment, the peak position data $\theta_{px}$ was obtained in every engine cycle and the ignition angle for the next engine cycle is determined on the basis of the $\theta_{px}$ of the current engine cycle.

Figure 7:
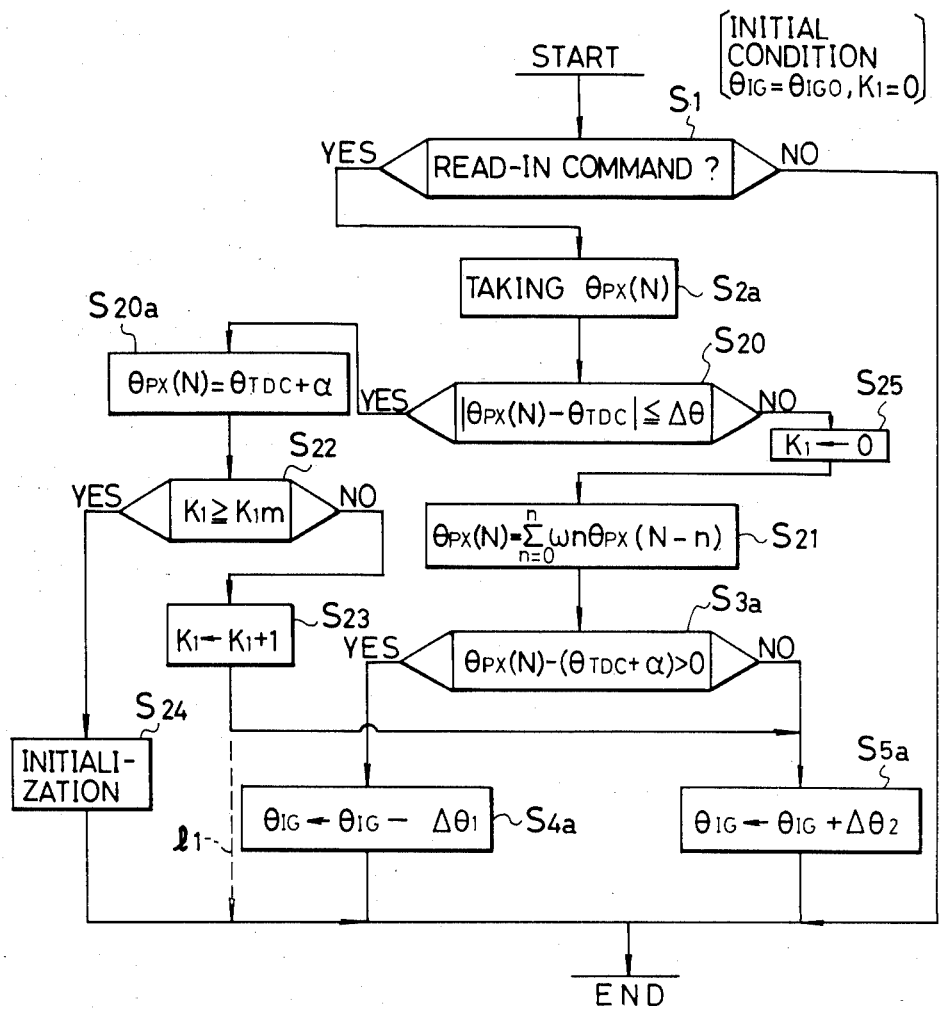
FIGS. 7 through 11 and 13 are flow charts describing action modes of the portions of FIG. 2, which are respectively modified from that of FIG. 5.

FIG. 7 shows another example of the action program for the ignition angle establishing circuit 8 in the ignition timing control device according to the present invention. In this program, the basic flow is not different from that of the program of the flow chart given in FIG. 5. In this program, the indicative pressure peak data $\theta_{px}$ is taken in by the circuit 8 while the read-in command signal from the decoder 11 is present (steps $S_1$ and $S_{2a}$) and the ignition angle is delayed or advanced in dependence on the difference between the $\theta_{px}$ and $(\theta_{TDC}+\alpha)$ (steps $S_{3a}$, $S_{4a}$ and $S_{5a}$).

However, according to this embodiment, $\theta_{px}$ is grasped as a group of data which are generated in the sequence and the indicative pressure peak position data obtained in the N-th engine cycle is expressed as $\theta_{px}(N)$ (step $S_{2a}$).

When an engine misfire occurs, combustion will not take place in the cylinder and the indicative pressure peak arises in the vicinity of $\theta_{TDC}$. Since furthermore, the indicative pressure peak position data obtained in the engine cycle involving a misfire is not based on normal combustion, it is not appropriate to be used as a basis for the indicative pressure peak position control of the subsequent engine cycle. Therefore, $\theta_{px}(N)$ and $\theta_{TDC}$ are compared in advance and the arithmetic operation for $\theta_{px}(N)$ is performed only when the difference thereof is greater than $\Delta\theta$ (steps $S_{20}$ and $S_{21}$). In this arithmetic operation step $S_{21}$, the current data value is corrected by the preceding indicative pressure peak position data values in the (N—1)—th, (N—2)—th, ... , (N—n)—th engine cycles according to the following formula to enhance the stability of the feedback system.

$$\theta_{px}(N) = \sum_{n=0}^{n} \omega_n \theta_{px}(N-n)$$

As a concrete example, the current data may be derived from the average value of the four preceding data and the current data by setting $\omega_0=\omega_1=\omega_2=\omega_3\omega_4=1/5$ and $\omega_5=\omega_6=\ldots=\omega_n=0$. The averaging method is not limited by this, but may be based on averaging of an arbitrary number of data. And, it is also possible to set $\omega_n=(1/L)^n$ (where $L>1$ and $n>0$).

The ignition angle advance and delay control may be made according to the thus derived results of comparison between $\theta_{px}$ and $(\theta_{TDC}+\alpha)$ (steps $S_{4a}$ and $S_{5a}$), but the angle advance $\Delta\theta_1$ and the angle delay $\Delta\theta_2$ need not be equal to each other but it may be that either $\Delta\theta_1>\Delta\theta_2$ or $\Delta\theta_1>\Delta\theta_2$, independent on the characteristics of the feedback system. Further, $\Delta\theta_1$ and $\Delta\theta_2$ may be functions of the difference between $\theta_{px}$ and $(\theta_{TDC}+\alpha)$.

When the difference between $\theta_{px}$ and $\theta_{TDC}$ is equal to or less than $\Delta\theta$, $\Delta\theta_{px}(N)$ is made equal to $\theta_{TDC}+\alpha$ (step $S_{20a}$). As long as $K_1<K_{1m}$ (step $S_{22}$), $K_1$ is set to equal to $K_1+1$ and an ignition angle delay control is conducted. However, if $K_1\geq K_{1m}$ due to the consecutive occurrence of misfires, the initialization step is conducted for resetting the ignition timing (step $S_{24}$). If $|\theta_{px}-\theta_{TDC}|>\Delta\theta$, then $K_1$ is set to zero and the program flow advances to the next step (step $S_{25}$). It is also possible not to conduct the ignition angle delay control when the engine misfire occurs and let the program flow advance to the next program cycle as indicated by the broken line $l_1$. It is also possible to ignore the exhaust stroke of the engine when this ignition timing control device is applied to a four-stroke engine. When it is the case, the exhaust stroke detection sensor may be omitted.

Figure 8:
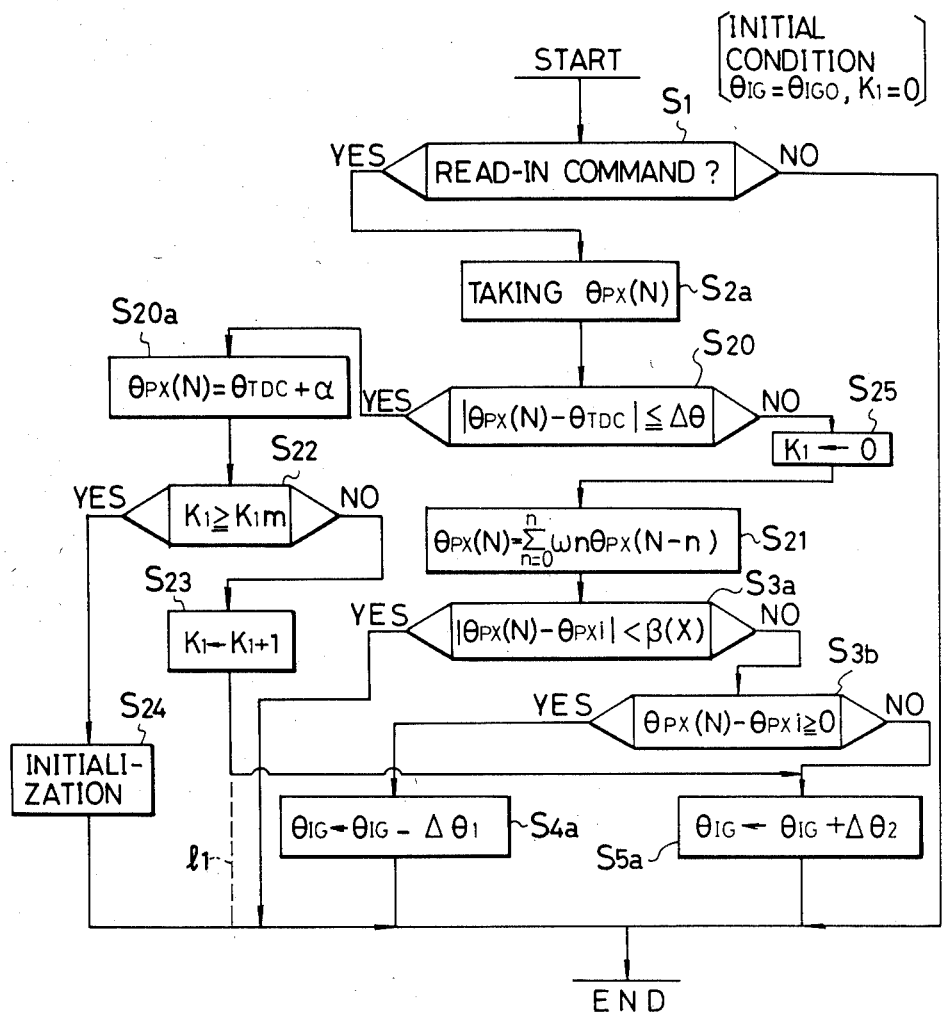

FIG. 8 shows still another example of the action program for the ignition angle establishing circuit 8. In this program, the control target value $\theta_{pxi}$ is not set to the single angle $(\theta_{TDC}+\alpha)$ but set to a control target zone $\theta_{pxi}\pm\beta(x)$. Thereby, the stability of the feedback system may be improved. The paramator x of $\beta(x)$ may be either one of engine rotational speed Ne, throttle opening $\theta_{TH}$ and engine intake manifold vacuum $P_B$. It is also possible to vary the value of $\beta$ using a combination of these parameters as a variable. Otherwise, this program is similar to that of FIG. 6. Further, it is also possible to set $\beta(x)$ as a constant $\beta$.

Figure 9:
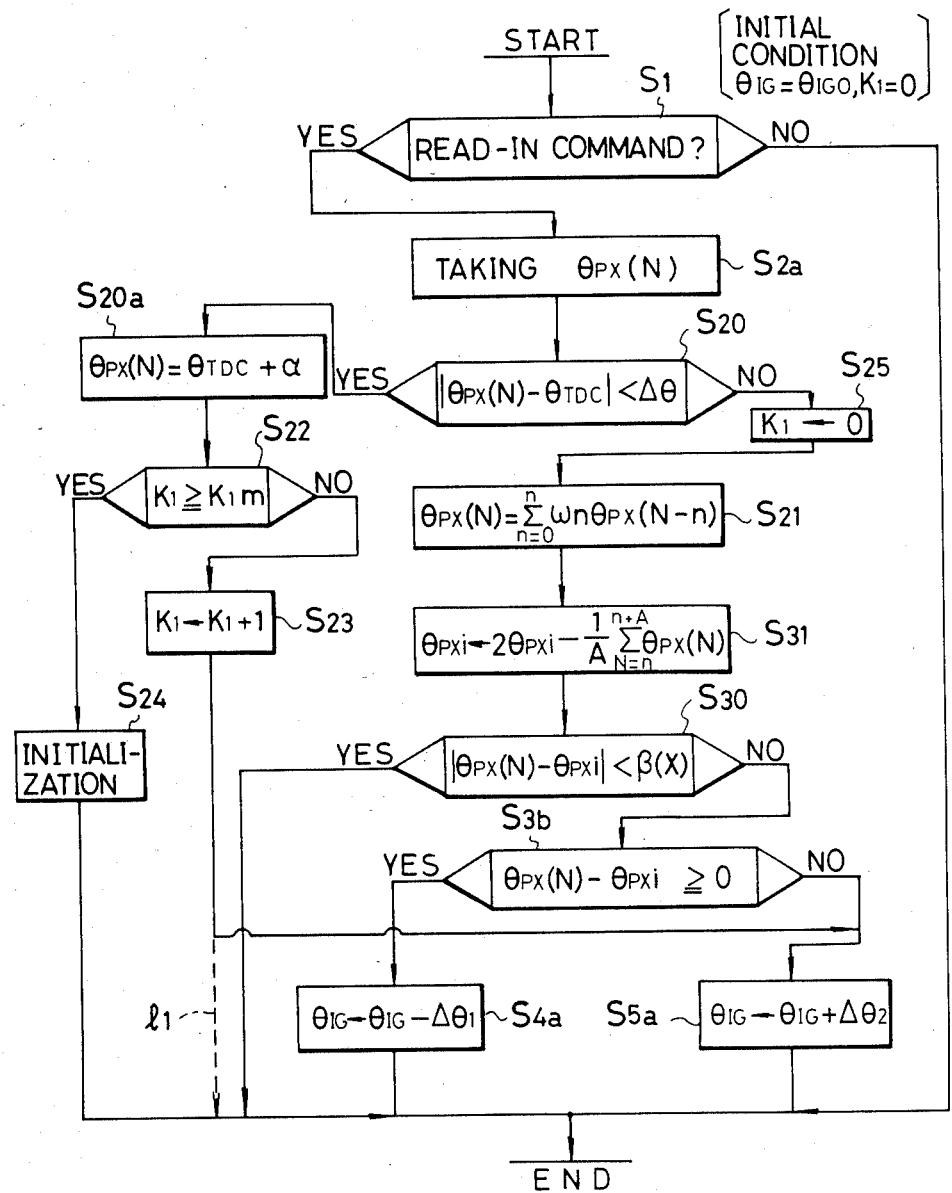

FIG. 9 shows another example of the action program performed by the ignition angle establishing circuit 8. In this program, the control target value $\theta_{pxi}$ for $\theta_{px}(N)$ is not fixed but the difference between $\theta_{pxi}$ and the average value of $$\theta_{px}(N) \left( = \frac{1}{A} \sum_{N=A}^{n+A} \theta_{px}(N) \right)$$

is taken into consideration for deriving $\theta_{pxi}$ to obtain a new $\theta_{pxi}$ which is equal to $(2\theta_{pxi}-\theta_{px}(N))$. This pxi pxi program is the same as the program given in the flow chart of FIG. 8 except the above mentioned point.

Figure 10:
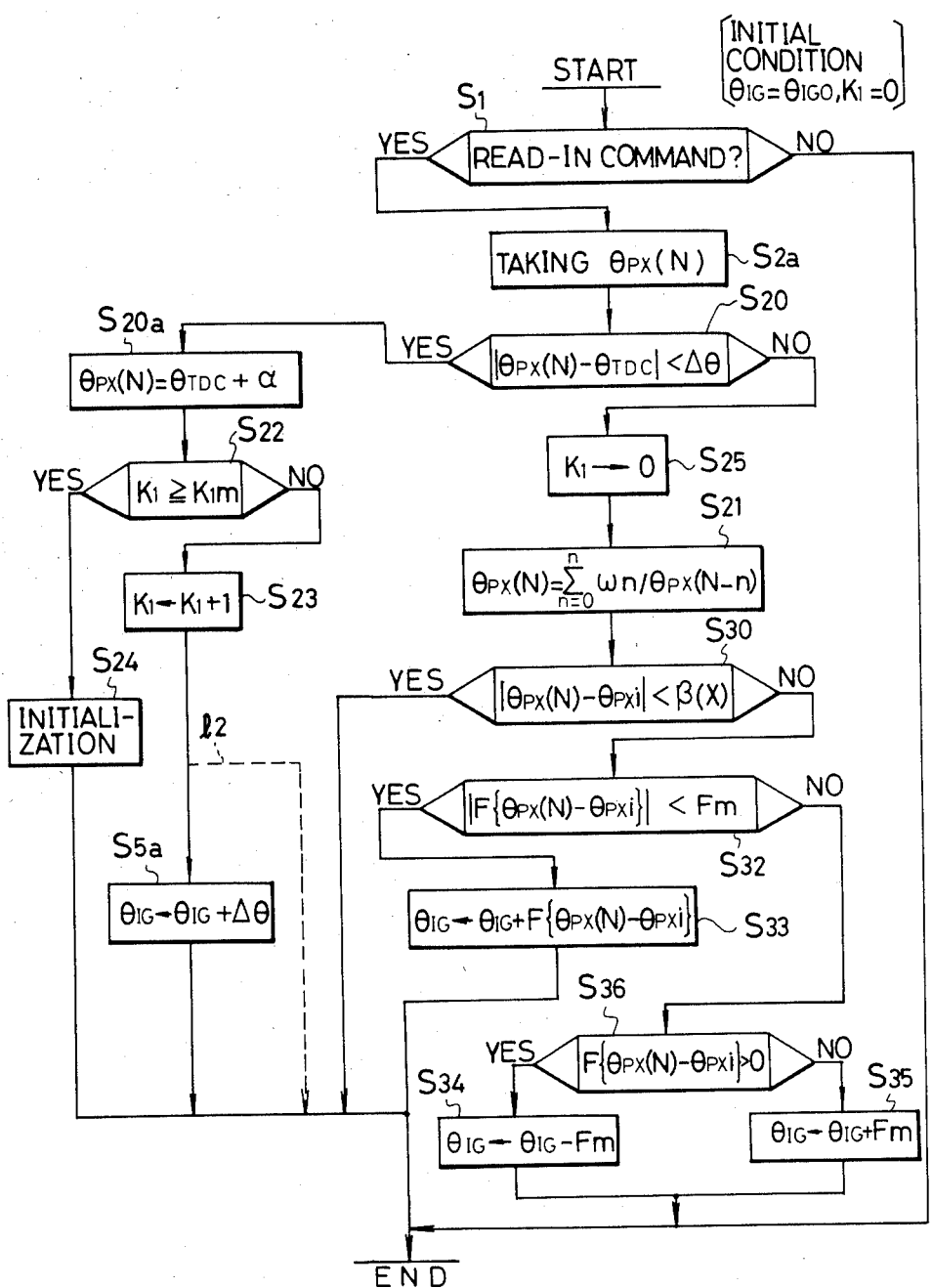

FIG. 10 shows another example of the action program to be performed by the ignition angle establishing circuit 8. This program is the same as the program of FIG. 7 in that the control target value $\theta_{pxi}$ for $\theta_{px}(N)$ is determined as a control target zone $\theta_{pxi}\pm\beta(x)$ instead of a single angle. However, the correction of $\theta_{IG}$ is given by an odd function $F[\theta_{px}(N)-\theta_{pxi}]$ having the deviation of $\theta_{px}(N)$ from $\theta_{pxi}$, or $[\theta_{px}(N)-\theta_{pxi}]$, as a deviation of $\theta_{px}(N)$ from $\theta_{pxi}$, or $[\theta_{px}(N)-\theta_{pxi}]$, as a variable (step $S_{33}$). This odd function $F(Z)$ may be an odd expressed in the general form of $(Z-\gamma)^n$ such as $Z$, $Z^3$, $Z^5$, ... In particular, when $n\sqrt{3}$, the feedback is rapidly increased as the deviation of $\theta_{px}(N)$ from the target value $\theta_{pxi}$ increases and a brisk feedback control may be expected. On the other hand since the possibility of producing a hunting may arise in the feedback system when the feedback is excessive, the maximum feedback is limited. The above-described actions are conducted in the steps $S_{32}$, $S_{34}$ and $S_{35}$ of the flow chart of FIG. 9.

In this case, the step $S_{5a}$ which delays the ignition timing by $\Delta\theta$ may be either conserved or omitted, as it is indicated by a broken line $l_2$.

Figure 11:
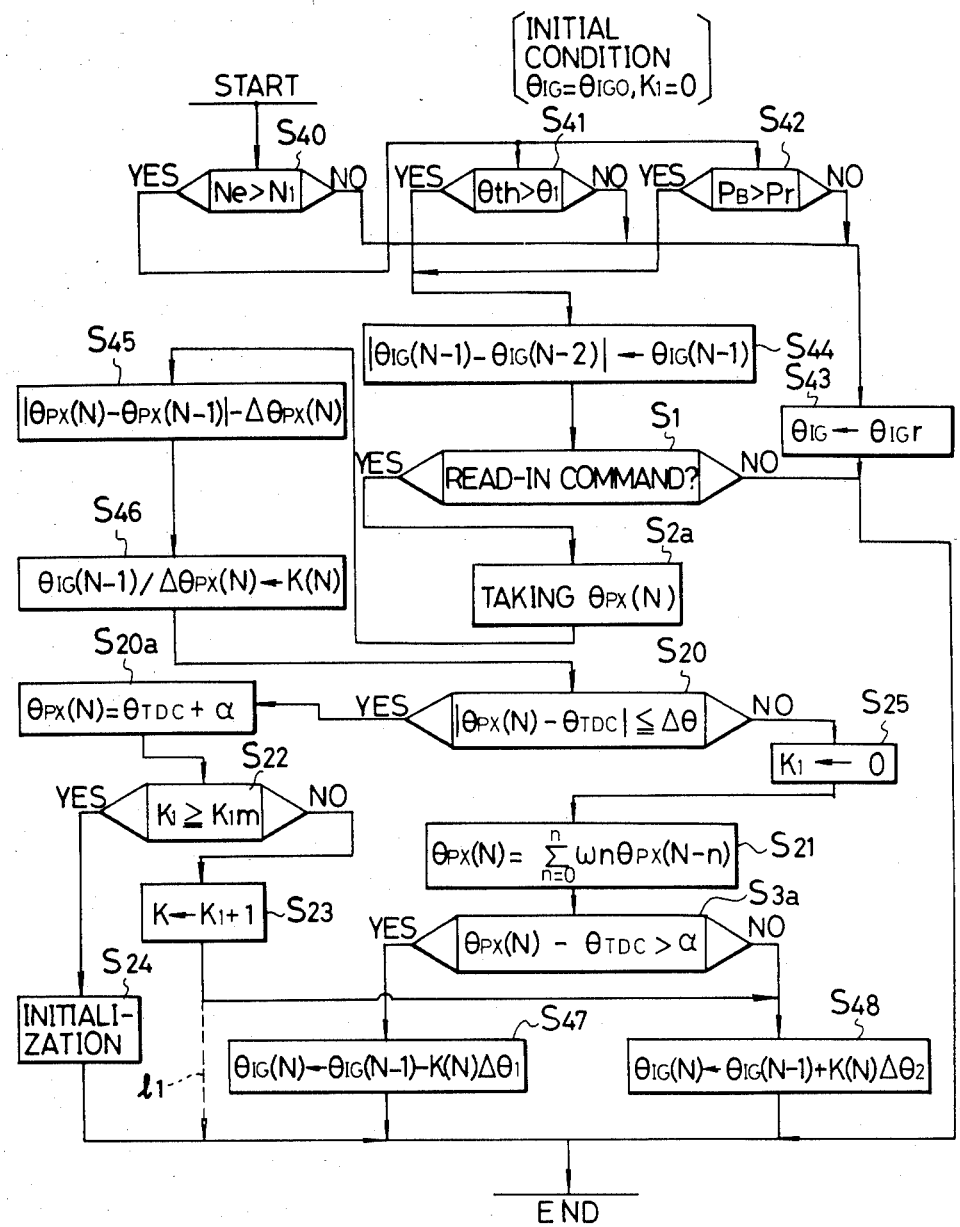
Figure 12:
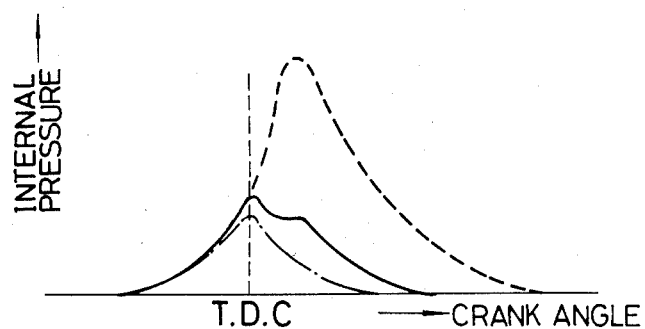
FIG. 12 is a graph showing that the indicative pressure change curve is dependent on the engine operating condition.

FIG. 11 shows yet another example of the action program of the ingnition angle establishing circuit 8. Specifically, in this program, rotational speed of the engine Ne, throttle opening $\theta_{th}$, an intake manifold vacuum $P_B$ among various engine parameters are compared with reference values Nr, $\theta$r and Pr, respectively, and the ignition angle $\theta_{IG}$ is fixed to $\theta_{IGr}$ in so far as they do not exceed their reference values (steps $S_{40}$, $S_{41}$, $S_{42}$ and $S_{43}$). The reference ignition angle $\theta_{IGr}$ may be varied in accordance with either engine parameters such as engine rotational speed and so on or a value selected from a map based on engine parameters. When either one of Ne, $\theta_{th}$ an $P_B$ has exceeded Nr, $\theta$r and Pr, respectively, the feedback action is to take place. The reason why the switch over between the determination of the ignition angle $\theta_{IG}$ based on feedback control on the basis of various engine parameters and the use of the fixed $\theta_{IG}$ is made here is that the indicative pressure near the top dead center due only to the compression of air may be greater than the indicative pressure near the top dead center due to the combustion in the cylinder. When the engine rotational speed is low, the changes in the indicative pressure in such a case are shown by the chain-dot line in FIG. 12. When the throttle opening is small or the intake manifold vacuum is great, the engine load is small or the throttle opening is extremely small, the indicative pressure changes in such a manner as shown by a solid line curve in FIG. 12. In this case also, the position of the maximum indicative pressure peak is located near the top dead center and it is not suitable to feedback control the ignition angle. The dotted line curve in FIG. 12 shows the changes of the indicative pressure under normal operation condition. It is now to be understood that either step $S_{41}$ or $S_{42}$ may be omitted, if preferred.

When it is detected that the engine is under normal operation conditions or, in other words, is not in the state of low engine rotational speed, the state of extremely small throttle opening or the state of low engine load condition, indicative pressure peak position $\theta_{px}(N)$ may be taken. However, in this program, the difference $\Delta\theta_{IG}(N-1)$ between the ignition angle $\theta_{IG}(N-1)$ which was set up in the previous program cycle and the ignition angle $\theta_{IG}(N-2)$ which was set up in the yet previous program cycle is first computed (step $S_{45}$). Then, upon detection of the presence of the read-in command signal, the indicative pressure peak data $\theta_{px}(N)$ is taken in (steps $S_1$ or $S_{2a}$). Thereafter, the contents of the step S may be executed.

Then, the difference $\Delta\theta_{px}(N)$ between the present $\theta_{px}(N)$ and the preceding $\theta_{px}(N-1)$ is computed (step $S_{45}$), and the ratio $K(N)$ of $\Delta\theta_{px}(N)$ to the already obtained $\Delta\theta_{IG}(N-1)$ is derived in the step $S_{46}$. Thereafter, the steps $S_{20}$, $S_{21}$, $S_{22}$, $S_{23}$, $S_{24}$, $S_{25}$ and $S_{3a}$ are executed in the same way as described in connection with FIG. 7.

In thus advancing or delaying the previous ignition angle $\theta_{IG}(N-1)$ according to the peak position of $\theta_{px}(N)$, $\theta_{IG}(N-1)$ is either decreased or increase by $K(N)\cdot\Delta\theta_1$ or $K(N)\cdot\Delta\theta_2$ (steps $S_{47}$ and $S_{48}$).

This means that, since the current peak position $\theta_{px}(N)$ is based on the ignition angle $\theta_{IG}(N-1)$ computed during the preceding cycle and the previous peak position is based on the yet previous ignition angle $\theta_{IG}(N-2)$, the degree of influence of the change $\Delta\theta_{IG}(N-1)$ from $\theta_{IG}(N-2)$ to $\theta_{IG}(N-1)$ on the $\Delta\theta_{px}(N)$ from $\theta_{px}(N-1)$ to $\theta_{px}(N)$ is represented by $K(N)$ and it is reflected in the angle advance or delay control of the currently established ignition angle $\theta_{IG}(N)$ for the ignition of the next engine cycle.

Figure 13:
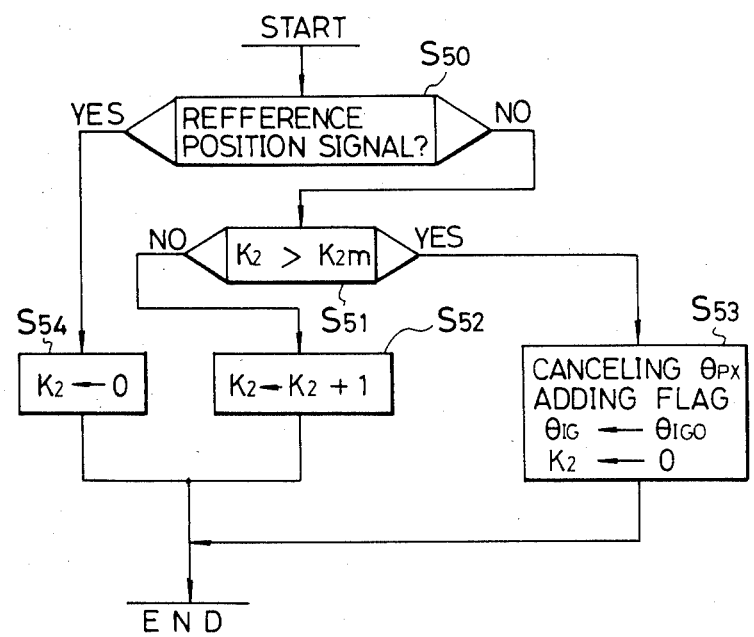

FIG. 13 shows a subroutine program which is effective for use in the ignition angle establishing circuit 8.

The ignition angle establishing circuit containing this subroutine program determines whether the reference position signal such as the TDC pulse is present or not (step $S_{50}$). If not, it is determined whether the time interval of the absence of the reference position signal has exceeded ($K_{2m}\times$clock period) or not (step $S_{51}$). If not, 1 is added to the constant $K_2$ and the program flow is terminated (step $S_{52}$). If, the time interval of the absence of the reference position signal has exceeded a time period of $K_{2m}\times$(clock period), then the set up ignition angle $\theta_{IG}$ is restored to the initial value $\theta_{IGo}$ and $K_2$ is set to zero while a cancel flag indicating that this $\theta_{px}$ data should be disregarded is added to this $\theta_{px}$ data (step $S_{53}$). When the presence of the reference position signal is detected, $K_2$ is set to zero (step $S_{54}$).

This subroutine program is effective for determining the stoppage of the engine operation and for preparing the next engine start.

It has been revealed by the Applicants that the ignition timing control method according to the present invention can preferably reflect the engine operational conditions in the establishment of the desired ignition timing at each engine cycle.

Those ignition timing control methods of the following embodiments include a step of determining one or more of the engine parameters such as the engine rotational speed Ne, the intake manifold vacuum $P_B$, the throttle opening $\theta_{TH}$ and the engine coolant temperature $T_w$.

Figure 14:
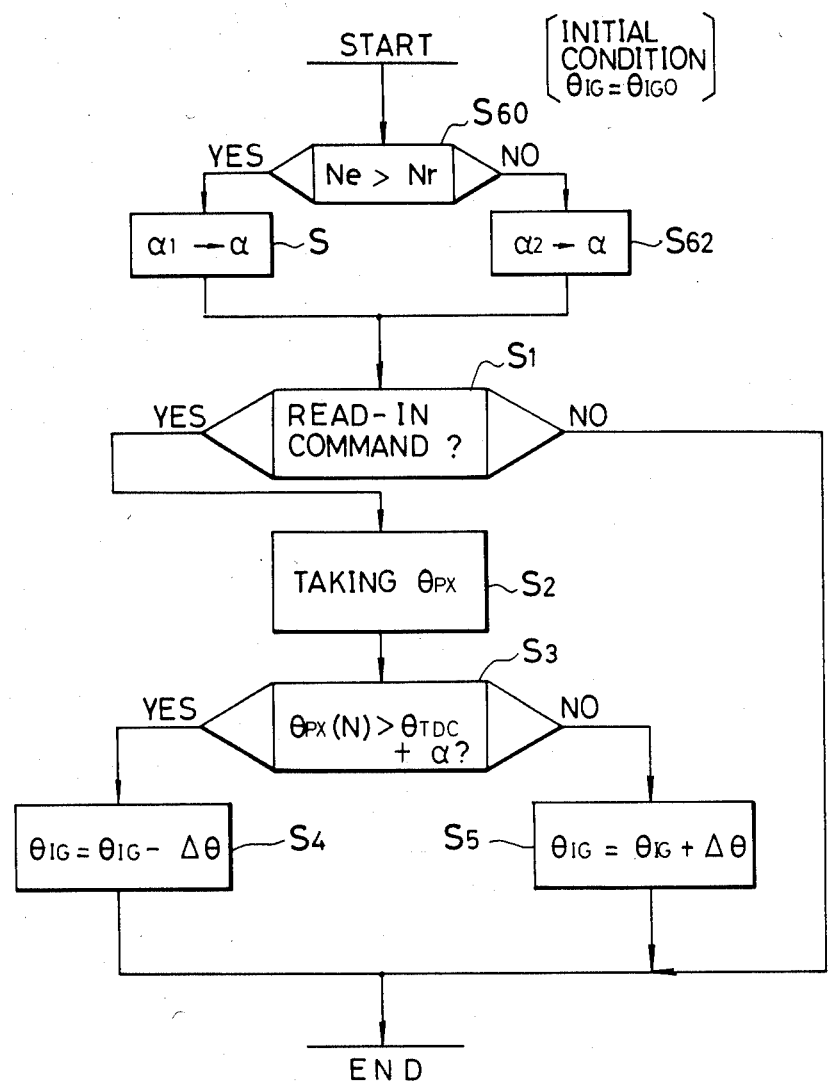
FIGS. 14 through 26 are flowcharts respectively showing programs to be executed by the ignition angle establishing circuit of the system shown in FIG. 2.

FIG. 14 shows a program to be executed by the ignition angle establishing circuit 8, which is the same as that of FIG. 5 except that the former includes a step $S_{60}$ of determining whether the present-time engine rotational speed Ne is lower than a predetermined low engine speed Nr such as an idle speed, or not. When the engine rotational speed Ne is higher than the speed Nr, then the parameter $\alpha$ is made equal to a value $\alpha_1$ (step $S_{61}$). When, on the contrary, the engine rotational speed Ne is equal to or smaller than the speed Nr, then the parameter $\alpha$ is made equal to value $\alpha_2$ (step $S_{62}$). The values $\alpha_1$ and $\alpha_2$ are respectively equal to, for example, 12° to 16° and 0° to 3°. Then, the calculation for establishing the ignition angle will be made in the succeeding steps $S_1$ through $S_5$.

The above arrangement is intended to maintain the ignition angle within a crank angle region close to the TDC when the engine is in either the cranking or the idle condition wherein the engine rotational speed is very low.

It should be understood that the cranking condition may be detected by a tension detector mounted on a kick pedal (not shown) in a motor cycle when this ignition timing control system is installed on the motor cycle engine.

Figure 15:
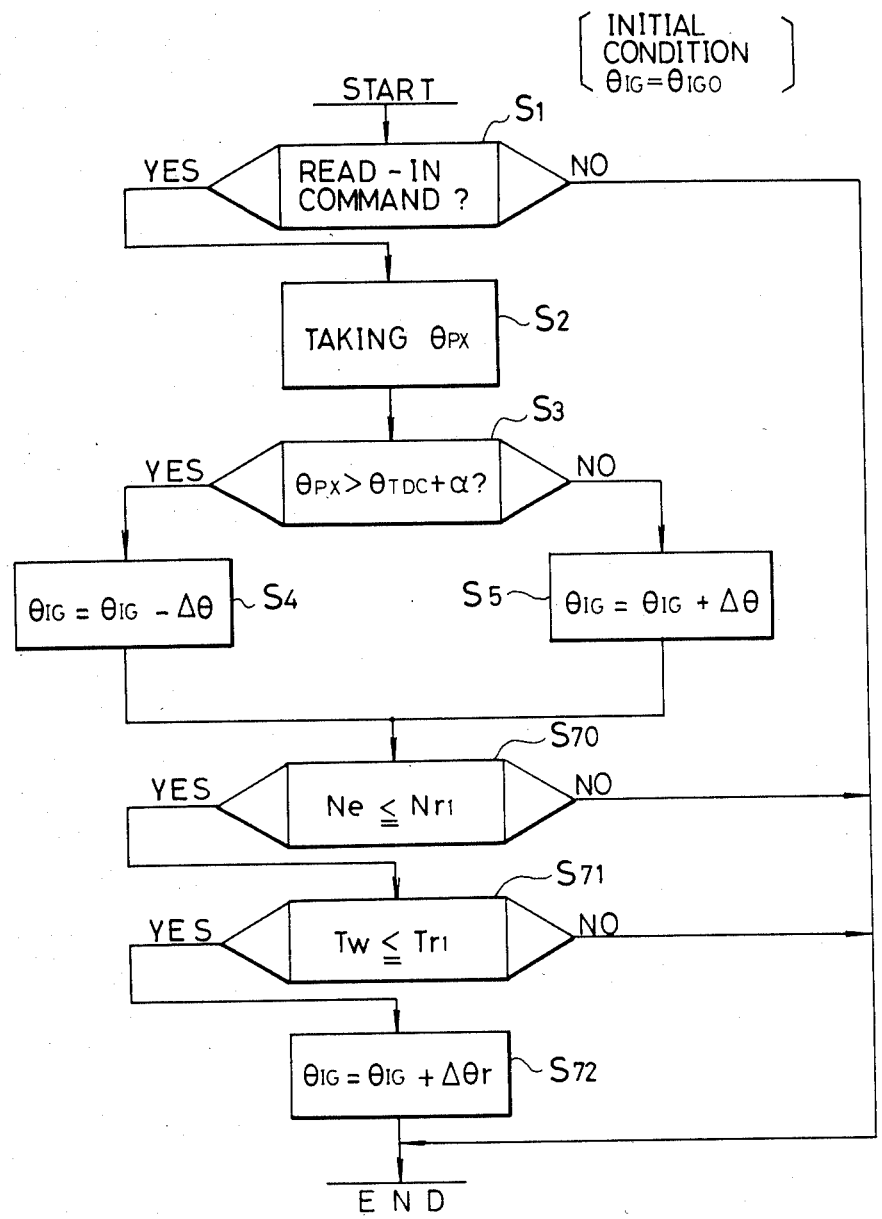

In FIG. 15, there is shown another program to be executed by the ignition angle establishing circuit 8, which is the same as that of FIG. 5 except that the former includes steps $S_{70}$, $S_{71}$ and $S_{72}$ which succeed the steps $S_4$ or $S_5$. In the step $S_{70}$, it is determined whether the engine rotational speed Ne is equal to or smaller than a reference engine speed $Nr_1$, which is a fast-idle speed slightly higher than a normal idle speed. When the engine rotational speed Ne is equal to or smaller than the reference engine speed $Nr_1$, then the engine coolant temperature $Tw_1$ is compared with a reference temperature $Tr_1$ which may be a normal atmospheric temperature, at a step $S_{71}$. When the engine temperature $T_w$ is equal to or smaller than the reference temperature $Tr_1$ the once established ignition angle $\theta_{IG}$ is retarded by a small angle $\Delta\theta_{IG}$ at a step $S_{72}$.

With the above-mentioned arrangement, any engine stall can be avoided even though the piston accommodated in the power cylinder is subjected to high friction during the fast-idle state under a low engine temperature due to high viscosity of the engine oil within the power cylinder.

Figure 16:
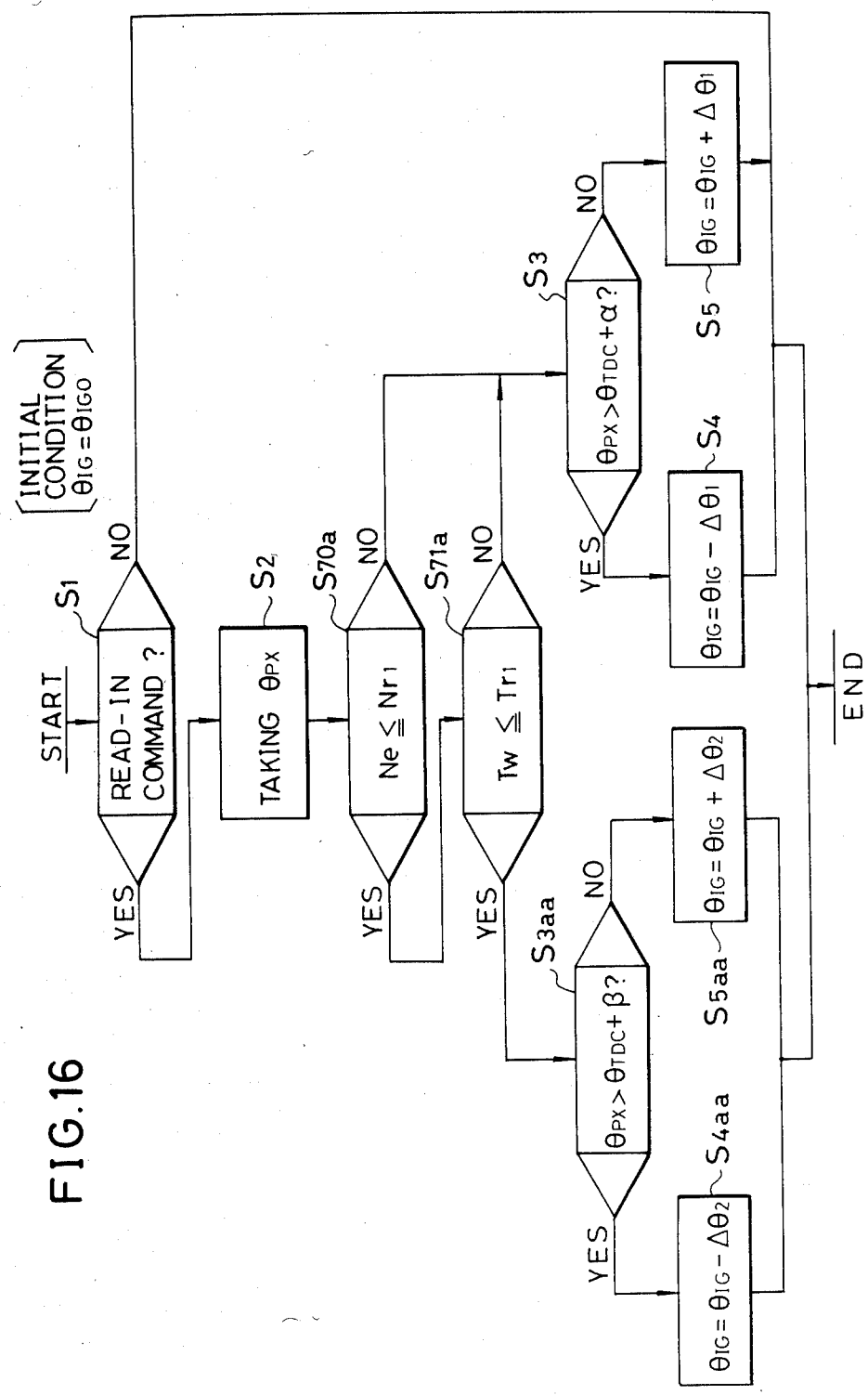

FIG. 16 shows another program which is effective for avoiding the engine stall even under the fast idle state at a low engine temperature. In this program, the target ignition angle is shifted to be retarded when the engine takes the fast-idle state under a low engine temperature. Steps $S_{70a}$ and $S_{71a}$ respectively have the same contents as those steps $S_{70}$ and $S_{71}$ but placed before the step of comparing the peak position signal $\theta_{px}$ with the target ignition angle.

When the engine takes a state other than the fast-idle state or operates under a higher temperature, the steps $S_3$, $S_4$ and $S_5$ would be performed which steps are the same as those steps $S_3$, $S_4$ and $S_5$ in the program of FIG. 5. When, however, the engine takes the fast-idle state at a low engine temperature, then the target ignition angle is set to $\theta_{TDC}+\beta$ which is larger than the angle $\theta_{TDC}+\alpha$ in the succeeding steps $S_{3aa}$, $S_{4aa}$ and $S_{5aa}$.

Figure 17:
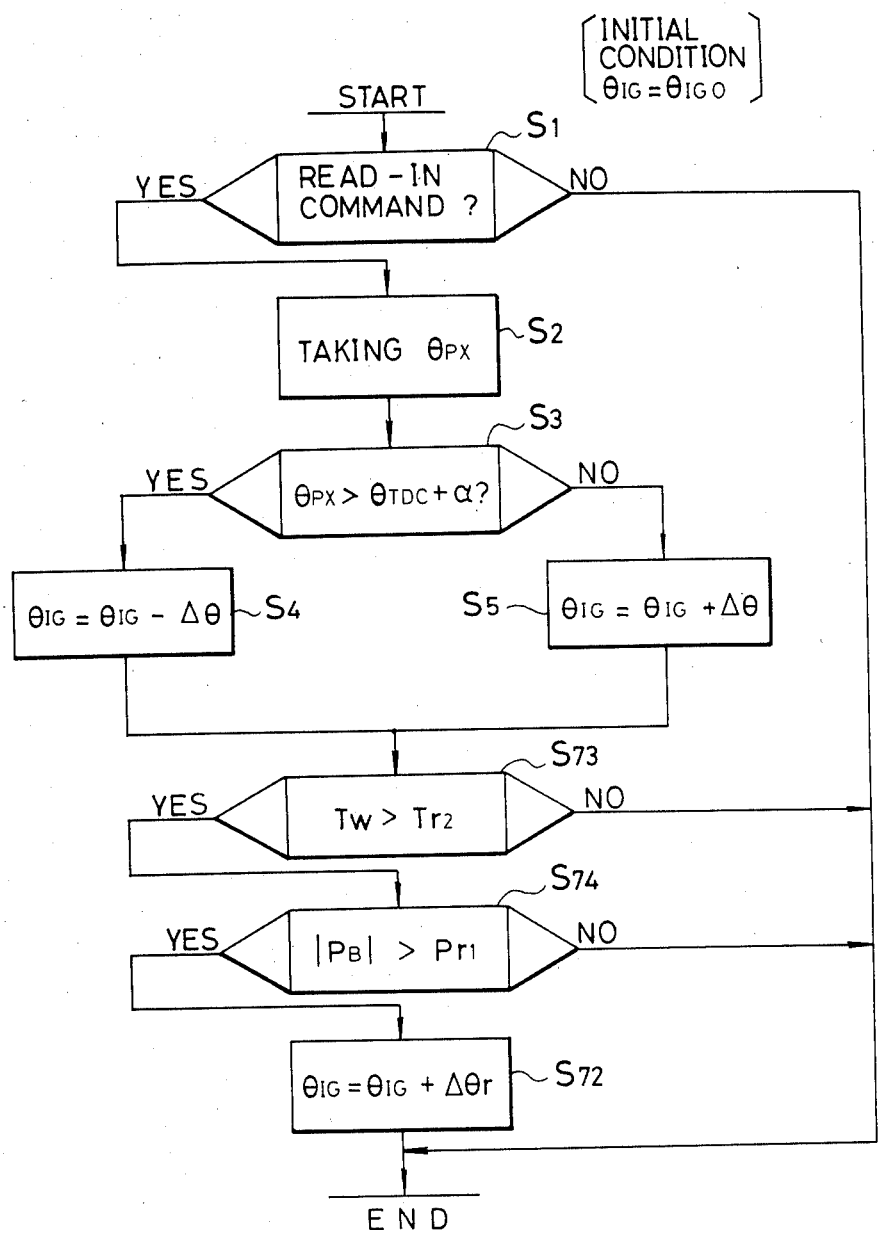

In FIG. 17, there is shown another program which is the same as that of FIG. 5 except that the former includes steps $S_{73}$ and $S_{74}$ which should be executed after the establishment of the desired ignition angle $\theta_{IG}$. In the step $S_{73}$, the engine temperature $T_w$ is compared with a reference high temperature $T_{r2}$. When the engine temperature $T_w$ is higher than the reference high temperature then the absolute value of the intake manifold vacuum $P_B$ is compared with a reference high pressure $P_{r1}$. When the absolute value of the intake manifold vacuum $P_B$ is higher than the reference high pressure $P_{r1}$ it can be said that the engine is subjected to a high load.

With the above arrangement, the ignition angle is set to be somewhat retarded when the engine load is relatively high at a high engine temperature, so that it can be avoided that the ignition timing becomes too early to cause unwanted engine state such as knockings. When $|P_B|$ is larger than $P_{r1}$, the once established ignition angle $\theta_{IG}$ is retarded by a small angle $\Delta\theta_r$.

Figure 18:
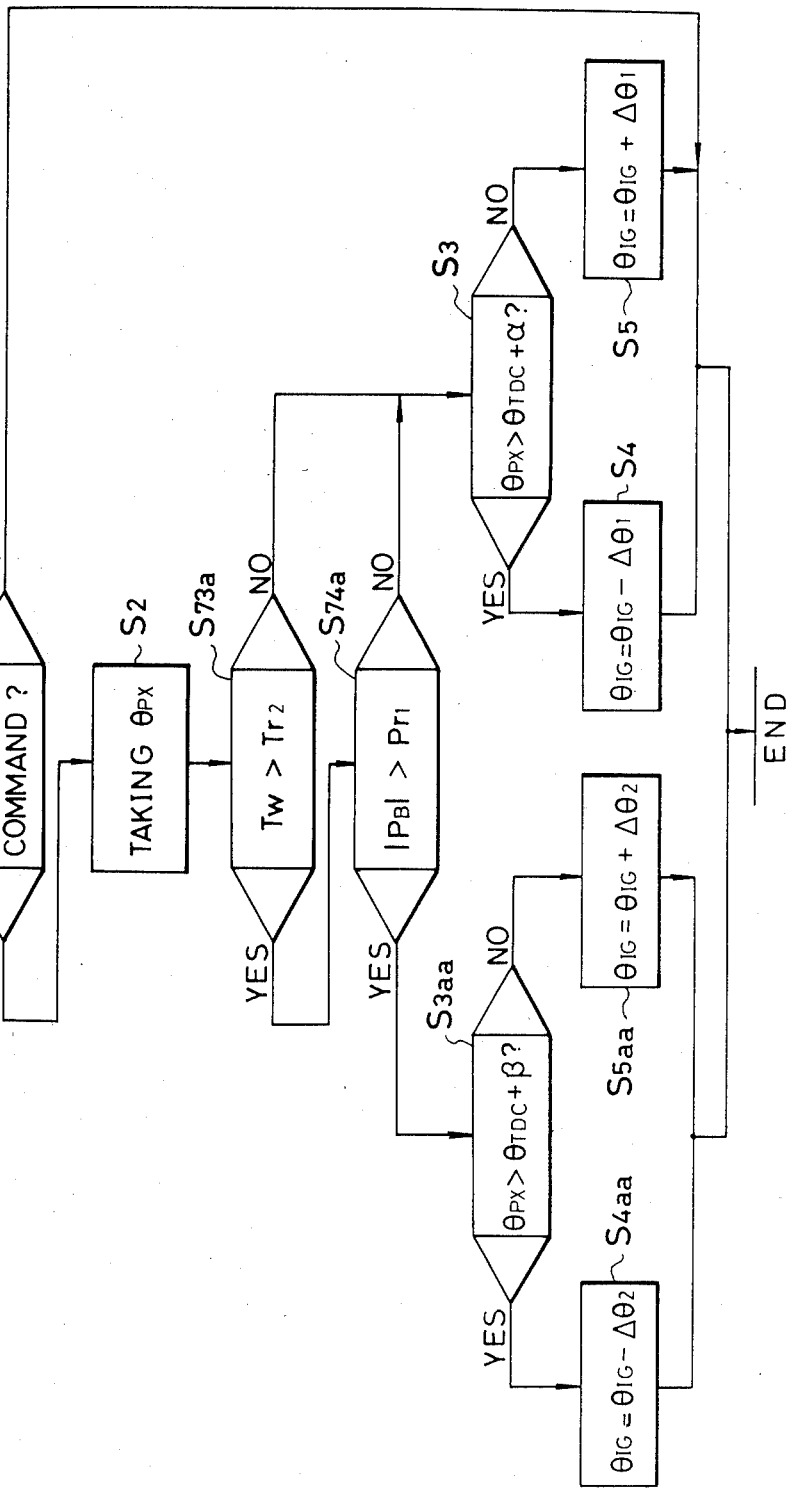

In FIG. 18, there is shown another program to be executed by the ignition angle establishing circuit 8, which is the same as that of FIG. 16 except that the steps $S_{70a}$ and $S_{71a}$ are substituted for the steps $S_{73a}$ and $S_{74a}$ respectively corresponding to the steps $S_{73}$ and $S_{74}$.

This program causes the same effect as that of FIG. 17.

Figure 19:
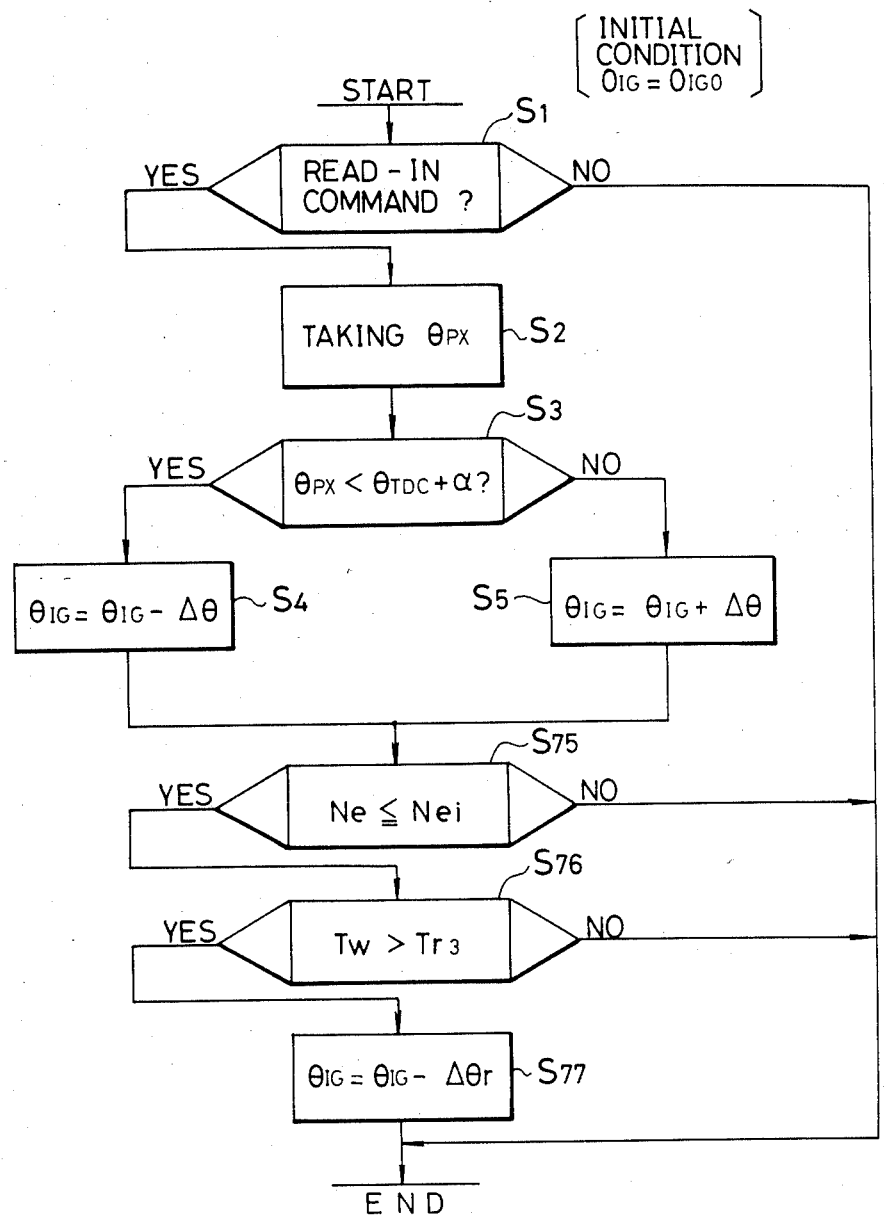

In FIG. 19, there is shown another program to be executed by the ignition angle establishing circuit 8, which is the same as that of FIG. 5 except that the former includes steps of $S_{75}$, $S_{76}$ and $S_{77}$ succeeding to the establishment of the ignition angle for the next cycle. In the step $S_{75}$, it is determined whether or not the engine rotational speed Ne is equal to or lower than an idle speed Nei. When the engine rotational speed Ne is lower than the idle speed Nei, the engine temperature $T_w$ is compared with a reference high temperature $T_{r3}$ which may be equal to the reference high temperature $T_{r2}$. When the engine temperature $T_w$ is higher than the reference high temperature $T_{r3}$, the ignition angle $\theta_{IG}$ is further advanced by a small angle $\theta_r$, which causes the suppression of the engine temperature so as to avoid an over-heat state even immediately after a long time cruising at high speed.

Figure 20:
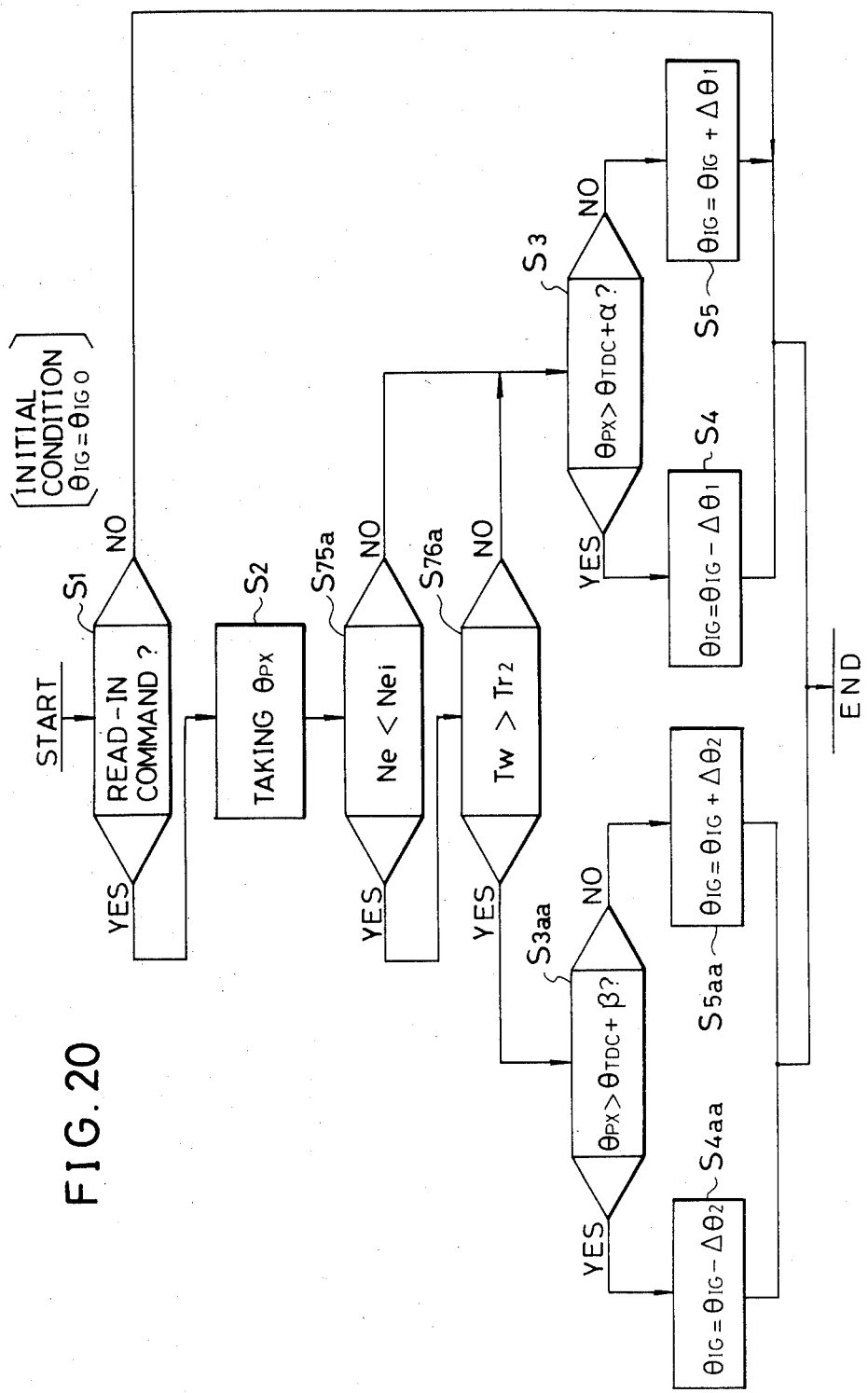

In FIG. 20, there is shown another program to be executed by the ignition angle establishing circuit 8, which includes steps $S_{75a}$ and $S_{76a}$ respectively corresponding to the steps $S_{75}$ and $S_{76}$. Thus, the determination of an idle state under a high temperature is performed before the establishment of the ignition angle. Namely, the target crank angle, or zone if required, is advanced under the idle state at a high temperature in the succeeding steps $S_{3aa}$, $S_{4aa}$ and $S_{5aa}$. Otherwise, the target crank angle or zone is kept as usual in the steps $S_3$, $S_4$ and $S_5$.

Figure 21:
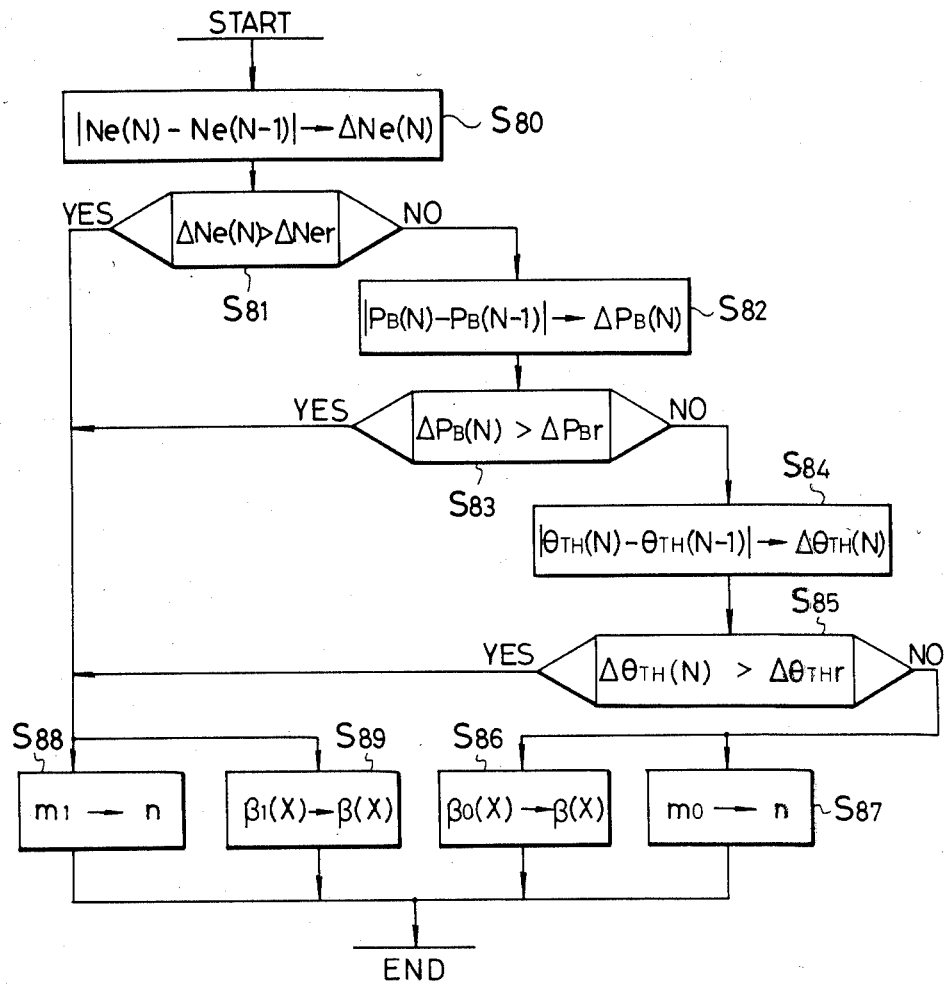

In FIG. 21, there is shown a sub-routine program to be executed by the ignition angle establishing circuit 8 in concurrence of the program already described with reference to FIGS. 8 through 11.

In this sub-routine program, the change of rates $\Delta Ne(N)$, $\Delta P_B(N)$ and $\Delta\theta_{TH}(N)$ of the respective engine parameters $Ne(N)$, $P_B(N)$ and $\theta_{TH}(N)$ are detected in the steps $S_{80}$, $S_{82}$ and $S_{84}$.

When either one of the engine parameters changes rapidly, then the width $\beta(x)$ of the target peak position zone is set to $\beta_1(x)$ in a step $S_{89}$ and the average number n for the peak position signal $\theta_{px}$ is set to a predetermined number $m_1$. When all the change of rates of the engine parameters $Ne(N)$, $P_B(N)$ and $\theta_{TH}(N)$ are relatively small, that is, the engine takes a steady state, then the width $\beta(x)$ and the average number n are respectively set to $\beta_o(x)$ and $m_o$ respectively larger than the width $\beta_1(x)$ and the number $m_1$ in the steps $S_{86}$ and $S_{87}$.

With the above arrangement, the feedback response for the ignition timing control system will be reduced during a steady state of the engine in comparison with a transient state of the engine, so that the overall feedback system can operate stably notwithstanding various changes in the engine operational state.

It is to be noted that both of the width and the average number are not be changed but either one of them may be changed, if preferred.

Figure 22:
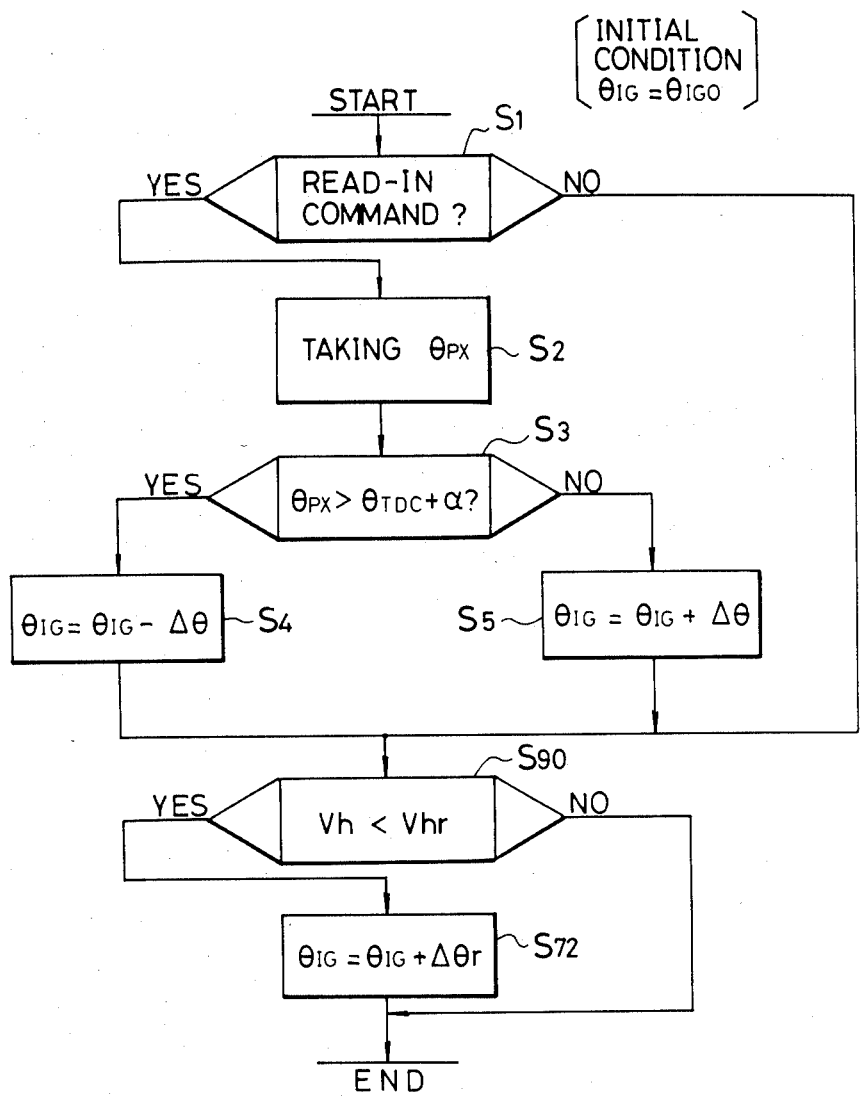

In FIG. 22, there is shown another program to be executed by the ignition angle establishing circuit 8, in case the ignition timing control system is applied to an internal combustion engine mounted on a vehicle as the prime mover thereof.

This program is the same as that of FIG. 15, except that the former includes a step $S_{90}$ in substitution for the steps $S_{70}$ and $S_{72}$. In the step $S_{90}$, the vehicle speed Vh is compared with a reference speed Vhr. When the vehicle speed Vh is lower than the reference speed Vhr, the once established ignition angle $\theta_{IG}$ is retarded by a small angle of $\Delta\theta_r$, in the step $S_{72}$ so that unwanted contamination of the exhaust gases by, for example, hydro-carbons can be avoided even at a lower vehicle speed.

Figure 23:
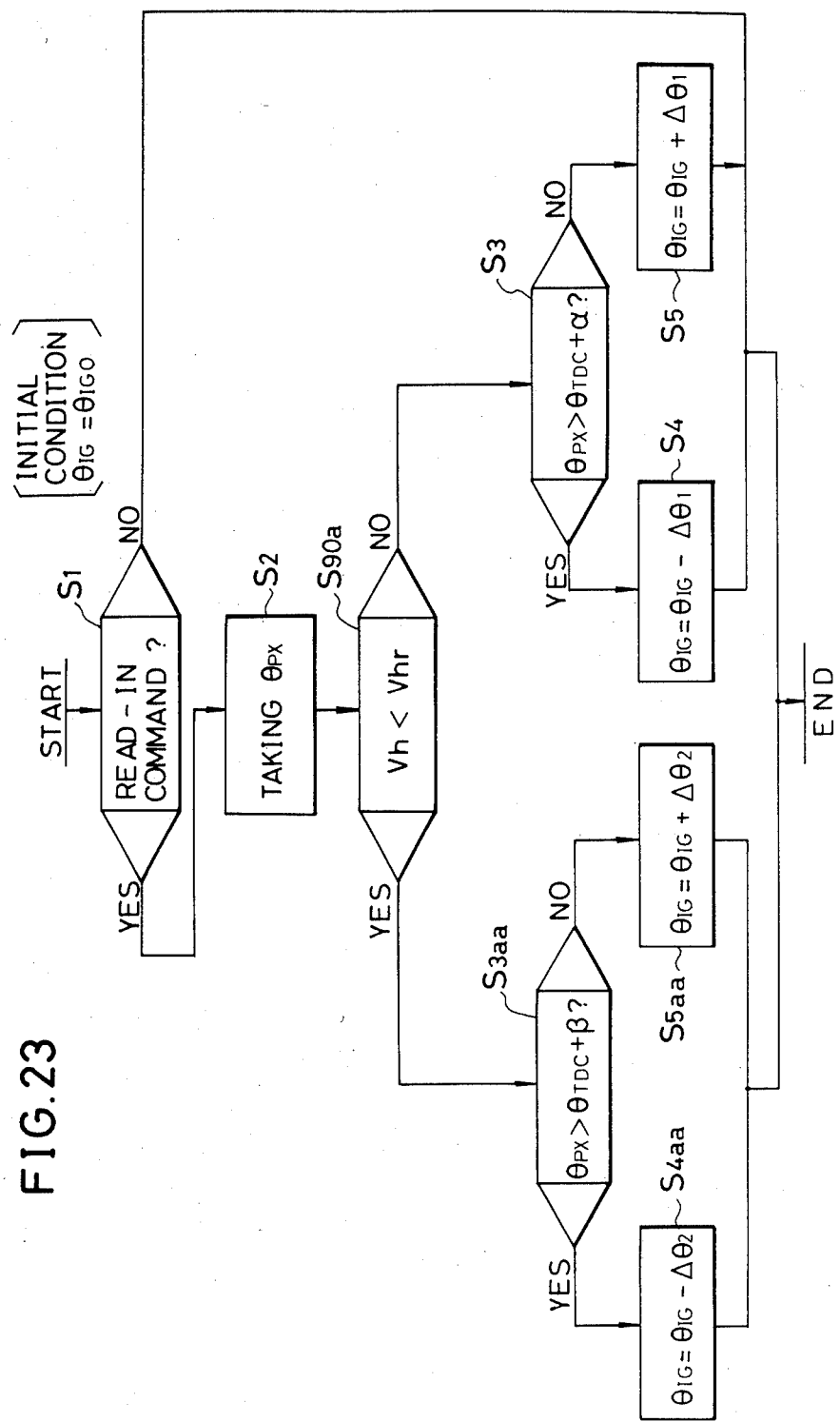

FIG. 23 shows another program to be executed by the ignition angle establishing circuit 8, which has the same purpose as that of FIG. 22. In this program, the determination of the low vehicle speed is performed in a step $S_{90a}$ before the establishment of the ignition angle. The target peak angle, or zone if required, is retarded in the steps $S_{3aa}$, $S_{4aa}$ and $S_{5aa}$ since the value $\beta$ is larger than the value $\alpha$, when the vehicle speed Vh is lower than the reference speed Vhr.

Figure 24:
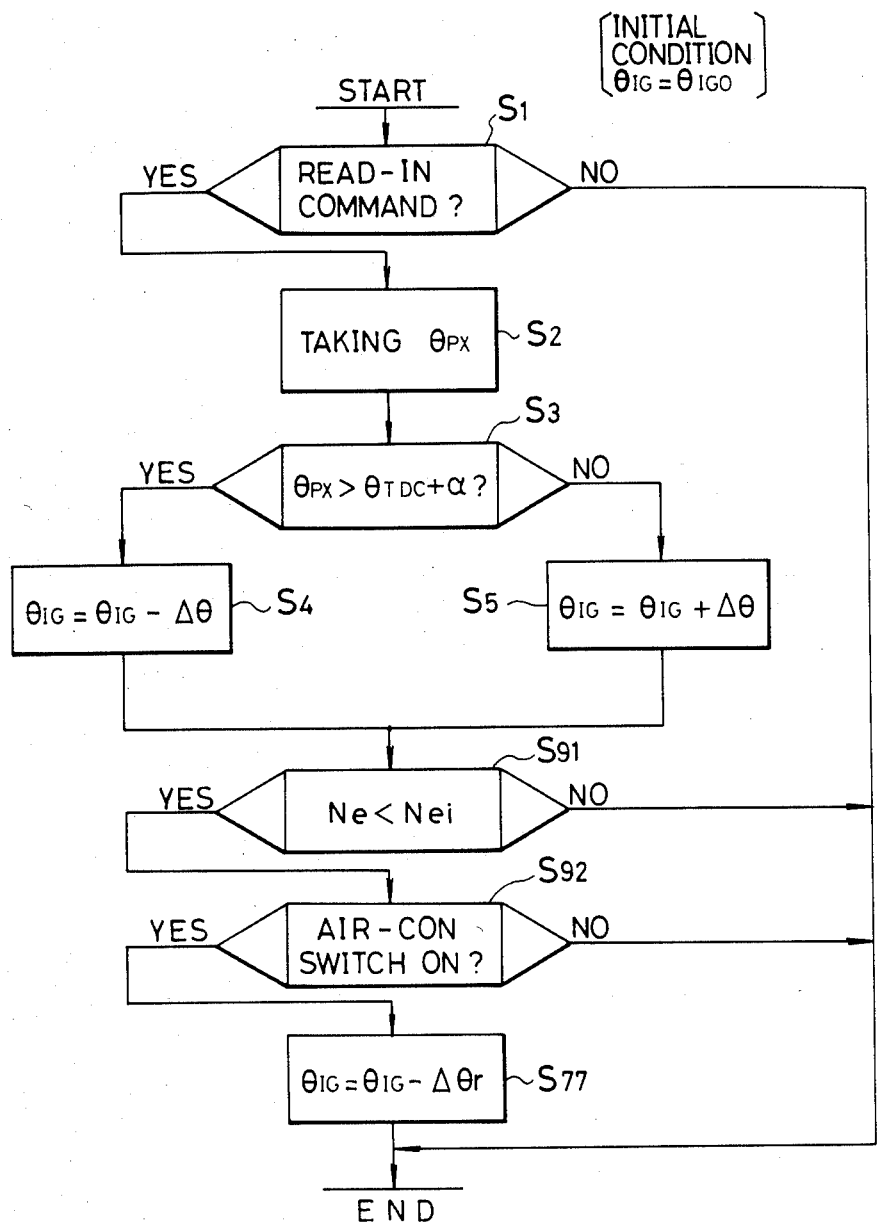

In FIG. 24, there is shown another program to be executed by the ignition angle establishing circuit 8 in case the ignition timing control system is applied to an internal combustion engine mounted as the prime mover on a vehicle which is installed with an air conditioning system.

This program is the same as that of FIG. 19, except that the former includes steps $S_{91}$ and $S_{92}$ in substitution for the steps $S_{75}$ and $S_{76}$. In the step $S_{91}$, the engine rotational speed Ne is compared with an idle speed Nei. When the engine speed Ne is equal to or lower than the idle speed Nei, then it is determined whether or not the air conditioning system is under operation in the step $S_{92}$. When a switch for the air-conditioning system is ON, then the once established ignition angle is advanced, so that the engine can operates stably.

It is to be understood that the detection of the idle state of the engine can be done by watching other engine parameters such as the throttle opening and the vehicle speed.

Figure 25:
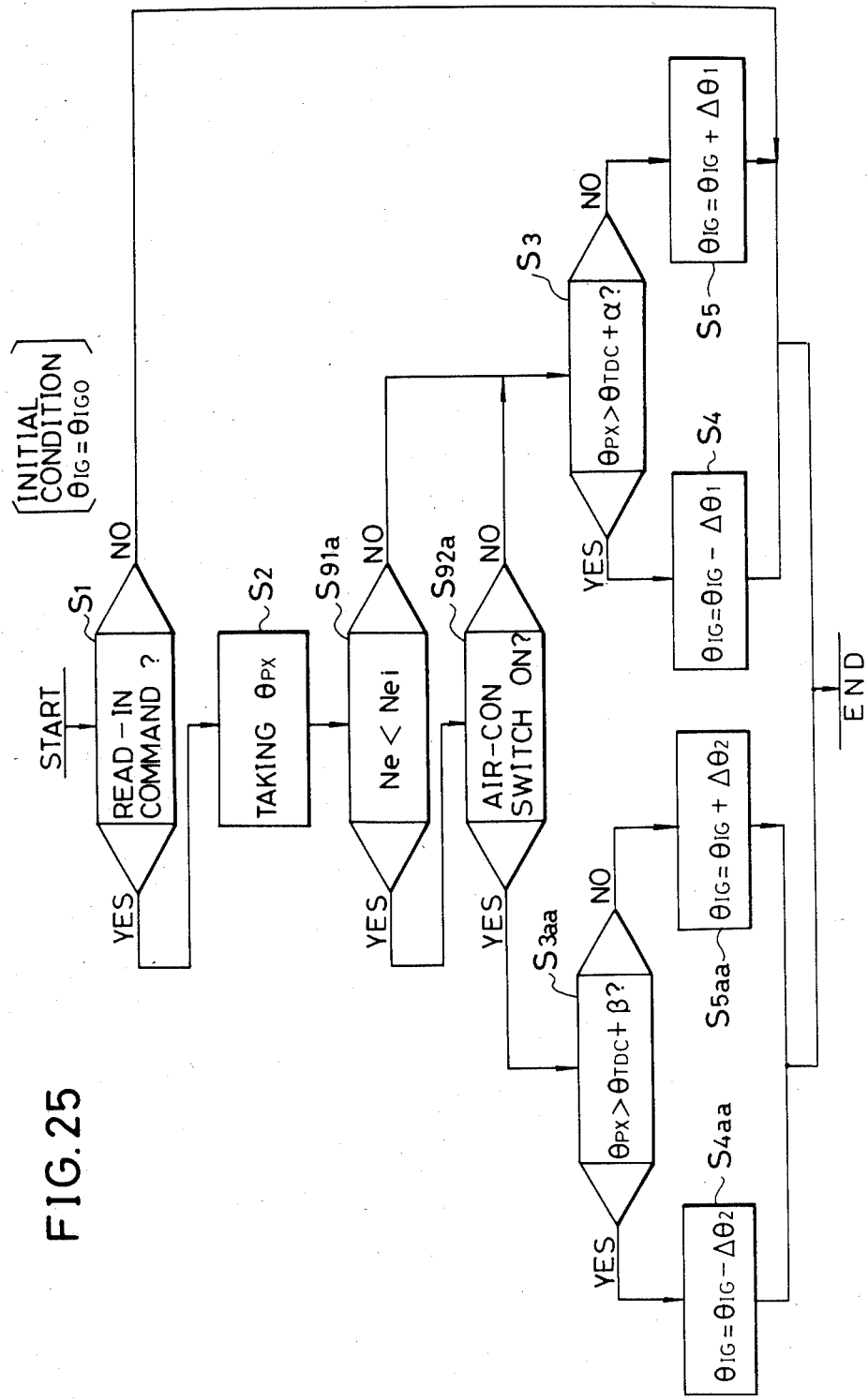

FIG. 25 shows another program to be executed by the ignition angle establishing circuit 8, which has the same purpose as that of FIG. 24. In this program, the determination of the idle state of the engine is performed in the step $S_{91a}$. The operation state of the air conditioning system is determined in the step $S_{92a}$. When the air conditioning system operates under the idle state of the engine, the target peak position angle is advanced so as to advance the ignition angle.

Figure 26:
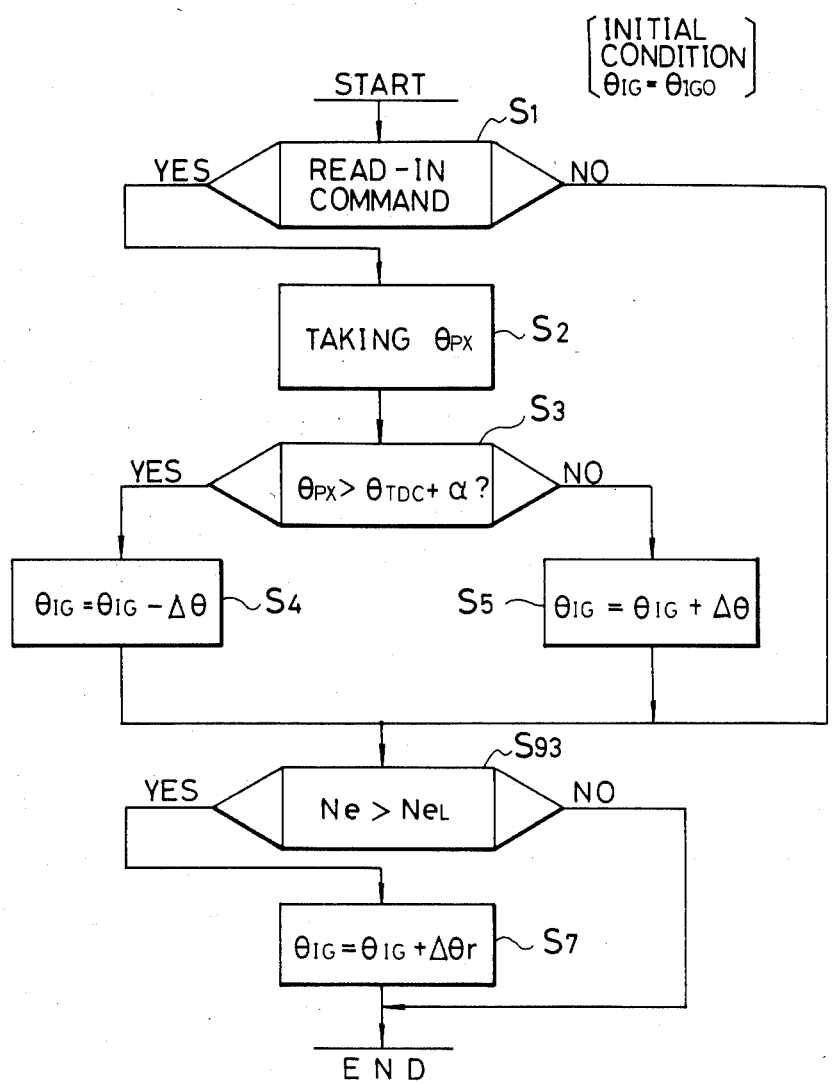

FIG. 26 shows another program to be executed by the ignition angle establishing circuit 8, which is the same as that of FIG. 15 except that this program includes a step $S_{93}$ in substitution for the steps $S_{70}$ and $S_{71}$. In the step $S_{93}$, the engine rotational speed Ne is determined whether it exceeds a predetermined a high speed $Ne_L$ within an over speed zone.

By the above arrangement, the next-cycle ignition angle is retarded when the engine rotational speed Ne falls within the over speed zone above the high speed $Ne_L$, thereby to suppress the engine speed.

As seen from the above embodiments, the ignition timing of an internal combustion engine is regulated so as to align the actual peak position $\theta_{px}$ to a target position which is represented by a crank angle $\theta_{pxi}$ or a crank angle zone $(\theta_{pxi} \pm \beta)$ according to the teachings of the present application.

What is claimed is:

1. An ignition timing control method for an internal combustion engine mounted on a vehicle, having a cruising speed not dependent on engine speed as a prime mover thereof, said method comprising the steps of:

generating a reference position pulse every time the rotational angle position of said internal combustion engine reaches a reference crank angle position;

generating an indicative pressure signal which is representative of the inner pressure in the combustion chamber of said engine;

detecting the maximum peak position of said indicative pressure signal during an internal between two consecutive ones of said reference position pulses so as to produce an indicative pressure peak position signal representing the maximum peak position in the crank angle of said engine; and establishing a next-cycle ignition angle at which said engine is to be ignited within the next engine cycle, in accordance with said indicative pressure peak position signal, said step of establishing the next-cycle ignition angle including, a first step of detecting engine parameters of said engine, a second step of taking said indicative pressure peak position signal in synchronism with the engine operation, a third step of establishing a target crank position in accordance with the cruising speed of said vehicle, a fourth step of comparing the taken indicative pressure peak position signal with said target peak position so as to produce a discrimination signal indicating a relation between said taken indicative pressure peak position signal and the established target crank position, and a fifth step of determining said next-cycle ignition angle in synchronism with the engine operation by modifying a previous cycle ignition angle which has been determined in a previous engine cycle, in accordance with said discrimination signal.

2. The method of claim 1 wherein said target peak position is a target peak position angle.

3. The method of claim 1 wherein said target peak position is a target peak position angle zone.

4. An ignition timing control method for an internal combustion engine mounted on a vehicle as a prime mover thereof, said vehicle being equipped with an air conditioning system, said method comprising the steps of:

generating a reference position pulse every time the rotational angle position of said internal combustion engine reaches a reference crank angle position;

generating an indicative pressure signal which is representative of the inner pressure in the combustion chamber of said engine;

detecting the maximum peak position of said indicative pressure signal during an interval between two consecutive ones of said reference position pulses so as to produce an indicative pressure peak position signal representing the maximum peak position in the crank angle of said engine; and establishing a next-cycle ignition angle at which said engine is to be ignited within the next engine cycle, in accordance with said indicative pressure peak position signal, said step of establishing said next-cycle ignition angle including, a first step of detecting the engine rotational speed of said engine, a second step of taking said indicative pressure peak position signal in synchronism with the engine operation, a third step of establishing a target peak position in accordance with the engine rotational speed and the operating state of said air conditioning system, so that the target peak position is deviated toward advancement when the engine rotational speed is at an idle speed and the air conditioning system is in an operation state, a fourth step of comparing the taken indicative pressure peak position signal with said target peak position so as to produce a discrimination signal indicating a relation between said taken indicative pressure peak position signal nad the established target peak position, and a fifth step of determining said next-cycle ignition angle in syncrhonism with the engine operation by modifying a previous cycle ignition angle which has been determined in a previous engine cycle, in accordance with said discrimination signal.

5. The method of claim 4 wherein said target peak position is a target peak position angle.

6. The method of claim 4 wherein said target peak position is a target peak position angle zone.

7. An ignition timing control method for an internal combustion engine, said method comprising the steps of:

generating a reference position pulse every time when the rotational angle position of said internal combustion engine reaches a reference crank angle position;

generating an indicative pressure signal which is representative of the inner pressure in the combustion chamber of said engine;

detecting the maximum peak position of said indicative pressure signal during an interval between the consecutive two of said reference position pulses so as to produce an indicative pressure peak position signal representing the maximum peak position in the crank angle of said enigne;

storing the consecutively produced indicative pressure peak position signals;

sensing at least one of the engine parameters of said engine; and establishing a next-cycle ignition angle at which said engine is to be ignited within the next engine cycle, in accordance with a number of the most recently stored indicative pressure peak position signals which have consecutively appeared, said number being reduced when the sensed engine parameter changes greatly.

8. An ingition timing control method according to claim 7, in which said one of the engine parameters is selected from the group consisting of the engine rotational speed, the intake manifold vacuum and the throttle opening.

9. An ignition timing control method for an internal combustion engine, said method comprising the steps of:

generating a reference position pulse every time the rotational angle position of said internal combustion engine reaches a reference crank angle position;

generating an indicative pressure signal which is representative of the inner pressure in the combustion chamber of said engine;

detecting the maximum peak position of said indicative pressure signal during an interval between two consecutive ones of said reference position pulses so as to produce an idnciative pressure peak position signal representing the maximum peak position in the crank angle of said engine; and establishing a next-cycle ignition angle at which said engine is to be ignited within the next engine cycle, in accordance with said indicative pressure peak position signal, said step of establishing said next-cycle ignition angle including, a first step of detecting engine parameters of said engine, a second step of taking said indicative pressure peak position signal in synchronism with the engine operation, a third step of establishing a target peak position in accordance with at least one of said engine parameters, said third step including a step of retarding said target peak position when the engine rotational speed is lower than a predetermined speed equal to or lower than an idle rotational speed and the engine temperature is lower than a predetermined temperature, a fourth step of comparing the taken indicative pressure peak position signal with said target peak position so as to produce a discrimination signal indicating a relation between said taken indicative pressure peak position signal and the established target peak position, and a fifth step of determining said next-cycle ignition angle in synchronism with the engine operation by modifying a previous cycle ignition angle which has been determined in a previous engine cycle, in accordance with said discrimination signal.

10. The method of claim 9 wherein said target peak position is a target peak position angle.

11. The method of claim 9 wherein said target peak position is a target peak position angle zone.

12. An ignition timing control method according to claim 9, in which said engine parameters are the engine rotational speed, the intake manifold vacuum, the throttle opening and the engine temperature.

13. An ignition timing control method according to claim 9, in which said third step includes a step of shifting said target peak position closer to the top dead center when the engine rotational speed is lower than a predetermined engine rotational speed.

14. An ingition timing control method according to claim 9, in which said third step includes a steps of retarding said target peak position when the engine temperature is higher than a predetermined temperature and the engine load is relatively large.

15. An ignition timing control method according to claim 9, in which said third step includes a step of retarding said target peak position when the engine rotational speed falls within an over speed zone.

16. An ignition timing control method for an internal combustion engine, said method comprising the steps of:

generating a reference position pulse every time when the rotational angle position of said internal combustion engine reaches a reference crank angle position;

generating an indicative pressure signal which is representative of the inner pressure in the combustion chamber of said engine;

detecting the maximum peak position of said indicative pressure signal during an interval between two consecutive ones of said reference position pulses so as to produce an indicative pressure peak position signal representing the maximum peak position in the crank angle of said engine; and establishing a next-cycle ignition angle at which said engine is to be ignited within the next engine cycle, in accordance with said indicative pressure peak position signal, said step of establishing the next-cycle ignition including, a first step of detecting engine parameters of said engine, a second step of taking said indicative pressure peak position signal in synchronism with the engine operation, a third step of establishing a target peak position in accordance with at least one of said engine parameters, said third step including a step of advancing said target peak position when the engine temperature is higher than a predetermined temperature and the engine rotational speed is equal to or lower than an idle rotational speed, a fourth step of comparing the taken indicative pressure peak position signal with said target peak position so as to produce a discrimination signal indicating a relation between said taken indicative pressure peak position signal and the established target peak position, and a fifth step of determining said next-cycle ignition angle in synchronism with the engine operation by modifying a previous cycle ignition angle which has been determined in a previous engine cycle, in accordance with said discrimination signal.

17. The method of claim 16 wherein said target peak position is a target peak position angle.

18. The method of claim 16 wherein said target peak position is a target peak position angle zone.

19. An ignition timing control method for an internal combustion engine, said method comprising the steps of:

generating a reference position pulse every time when the rotational angle position of said internal combustion engine reaches a reference crank angle position;

generating an indicative pressure signal which is representative of the inner pressure in the combustion chamber of said engine;

detecting the maximum peak position of said indicative pressure signal during an interval between two consecutive ones of said reference position pulses so as to produce an indicative pressure peak position signal representing the maximum peak position in the crank angle of said engine; and establishing a next-cycle ignition angle at which said engine is to be ignited within the next engine cycle, in accordance with said indicative pressure peak position signal, in which said step of establishing the next-cycle ignition angle includes, a first step of detecting engine parameters of said engine, a second step of taking said indicative pressure peak position signal in synchronism with the engine operation, a third step of establishing a target peak angle zone having an angular width in accordane with at least one of said engine parameters, said third step including a zone regulating step of regulating the width of the target peak angle zone in accordance with at least one of the engine parameters, a fourth step of comparing the taken indicative pressure peak position signal with said target peak angle zone so as to produce a discrimination signal indicating a relation between said taken indicative pressure peak position signal and the established target peak angle zone, and a fifth step of determining said next-cycle ignition angle in synchronism with the engine operation by modifying a previous cycle ignition angle which has been determined in a previous engine cycle, in accordance with said discrimination signal.

20. An ignition timing control, method according to claim 19, in which said zone regulating step regulates the width of the target peak angle zone in accordance with an instantaneous value of at least one of the engine parameters.

21. An ignition timing control method according to claim 19, in which said zone regulation step regulates the width of the target peak angle zone in accordance with a change of rate of at least one of the engine parameters.

* * * * *